United States Patent
Warren

(10) Patent No.: US 12,444,273 B2
(45) Date of Patent: *Oct. 14, 2025

(54) SYSTEMS AND METHODS FOR GENERATING PERSONALIZED WAGER OPPORTUNITIES BASED ON A FANTASY SPORTS CONTEST

(71) Applicant: Ryan C. Warren, Ladera Ranch, CA (US)

(72) Inventor: Ryan C. Warren, Ladera Ranch, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/378,091

(22) Filed: Jul. 16, 2021

(65) Prior Publication Data

US 2021/0343122 A1 Nov. 4, 2021

Related U.S. Application Data

(63) Continuation of application No. 16/550,838, filed on Aug. 26, 2019, now Pat. No. 11,069,196.

(51) Int. Cl.
*G07F 17/32* (2006.01)
*G06Q 50/34* (2012.01)

(52) U.S. Cl.
CPC .......... *G07F 17/3288* (2013.01); *G06Q 50/34* (2013.01); *G07F 17/3272* (2013.01)

(58) Field of Classification Search
CPC .. G07F 17/3288; G07F 17/3272; G06Q 50/34
See application file for complete search history.

(56) References Cited

U.S. PATENT DOCUMENTS 6,126,543 A * 10/2000 Friedman ............... G07F 17/32
463/16
8,177,644 B2 5/2012 Anderson
(Continued)

FOREIGN PATENT DOCUMENTS

JP 2003030568 A 1/2003
JP 2014188334 A 10/2014
(Continued)

OTHER PUBLICATIONS

Fantasy Football 101: Settings. ESPN.con. Online. Jun. 5, 2017. Accessed via the Internet. Accessed Nov. 22, 2019. <URL: https://www.espn.com/fantasy/football/story/_/id/19540805/settings> (Year: 2017).*

(Continued)

*Primary Examiner* — Carl V Larsen
(74) *Attorney, Agent, or Firm* — Sheppard Mullin Richter & Hampton LLP

(57) ABSTRACT

A gaming system and method of facilitating personalized wager opportunities based on a user-selected fantasy sports team is disclosed. Players may first select athletes for a fantasy sports team. Based on the projected team score for the fantasy sports team selected by the player, a set of wager opportunities may be generated for that player. The wager opportunities may include a set of benchmark point levels and associated odds for the respective levels. Players can place wagers based on whether the actual total score of the fantasy sports team they selected exceeds one or more benchmark point levels and specify the amount to be wagered for each benchmark point level. Thus, a player can make wagers that are won or lost based on the performance of the player's fantasy team compared to the benchmark point levels, regardless of how other players' fantasy sports teams perform.

16 Claims, 11 Drawing Sheets

(56) References Cited

U.S. PATENT DOCUMENTS

| | | | |
|---|---|---|---|
| 8,396,777 B1* | 3/2013 | Fine | G06Q 10/04 705/36 R |
| 9,202,332 B2 | 12/2015 | Bahou | |
| 9,463,388 B2* | 10/2016 | Thompson | H04N 21/812 |
| 10,290,185 B2* | 5/2019 | Koustas | G07F 17/3288 |
| 10,463,975 B2* | 11/2019 | Lazarus | A63B 71/06 |
| 11,069,196 B2* | 7/2021 | Warren | G07F 17/3272 |
| 2002/0153656 A1* | 10/2002 | Maksymec | G07F 17/3288 273/138.1 |
| 2006/0183548 A1* | 8/2006 | Morris | G07F 17/32 463/42 |
| 2007/0111777 A1* | 5/2007 | Amaitis | G07F 17/3288 463/16 |
| 2007/0233585 A1* | 10/2007 | Ben Simon | G07F 17/3244 705/35 |
| 2008/0034055 A1* | 2/2008 | Das | G06Q 10/10 709/217 |
| 2008/0066111 A1* | 3/2008 | Ellis | H04N 21/458 725/57 |
| 2008/0229214 A1* | 9/2008 | Hamilton | G06Q 10/1091 715/751 |
| 2010/0069144 A1* | 3/2010 | Curtis | G07F 17/32 463/25 |
| 2010/0285827 A1 | 11/2010 | Kim | |
| 2010/0285857 A1* | 11/2010 | Anderson | G07F 17/32 463/9 |
| 2011/0003634 A1* | 1/2011 | Manteris | G07F 17/32 463/25 |
| 2012/0115585 A1 | 5/2012 | Goldman | |
| 2012/0289323 A1* | 11/2012 | Whitmire | G07F 17/3276 463/26 |
| 2013/0196753 A1* | 8/2013 | Miller | A63F 9/14 463/28 |
| 2015/0050988 A1* | 2/2015 | Nichols | G07F 17/3288 463/25 |
| 2015/0141112 A1 | 5/2015 | McDermott | |
| 2015/0221180 A1* | 8/2015 | Araico | G07F 17/326 463/11 |
| 2015/0365393 A1* | 12/2015 | Shyamsunder | H04L 67/10 726/4 |
| 2016/0055708 A1* | 2/2016 | Richardson | G07F 17/323 463/17 |
| 2016/0086441 A1* | 3/2016 | Cohen | G07F 17/3288 463/25 |
| 2016/0104347 A1* | 4/2016 | Yang | G07F 17/326 463/25 |
| 2016/0263483 A1* | 9/2016 | Le | A63F 13/352 |
| 2016/0300440 A1* | 10/2016 | Ortiz | G07F 17/326 |
| 2017/0001120 A1* | 1/2017 | Mueller | G07F 17/3244 |
| 2017/0316639 A1* | 11/2017 | Lyons | G07F 17/3244 |
| 2017/0333778 A1* | 11/2017 | Lavin | G06F 3/0481 |
| 2017/0357391 A1 | 12/2017 | Galfond | |
| 2019/0130698 A1* | 5/2019 | Simons | H04L 9/0643 |
| 2020/0005258 A1* | 1/2020 | Miller | G06F 40/174 |
| 2020/0027314 A1* | 1/2020 | Pilnock | G07F 17/3223 |
| 2020/0066103 A1* | 2/2020 | Nelson | G07F 17/3225 |
| 2020/0391121 A1* | 12/2020 | Jaramillo | G07F 17/3255 |
| 2020/0394259 A1* | 12/2020 | Onuma | G06F 17/18 |

FOREIGN PATENT DOCUMENTS

| | | |
|---|---|---|
| JP | 2016510226 A | 4/2016 |
| JP | 2018505468 A | 2/2018 |
| WO | 2008021448 A2 | 2/2008 |
| WO | 2014074392 A1 | 5/2014 |
| WO | 2016100942 A1 | 6/2016 |
| WO | 2018053298 A1 | 3/2018 |

OTHER PUBLICATIONS

"Fantasy Football 101: Settings". ESPN.com. Online. Jun. 5, 2017. Accessed via the Internet. Accessed Nov. 22, 2019. <URL: https://www.espn.com/fantasy/football/story/_/id/19540805/settings> (Year: 2017); 18 pages.

* cited by examiner

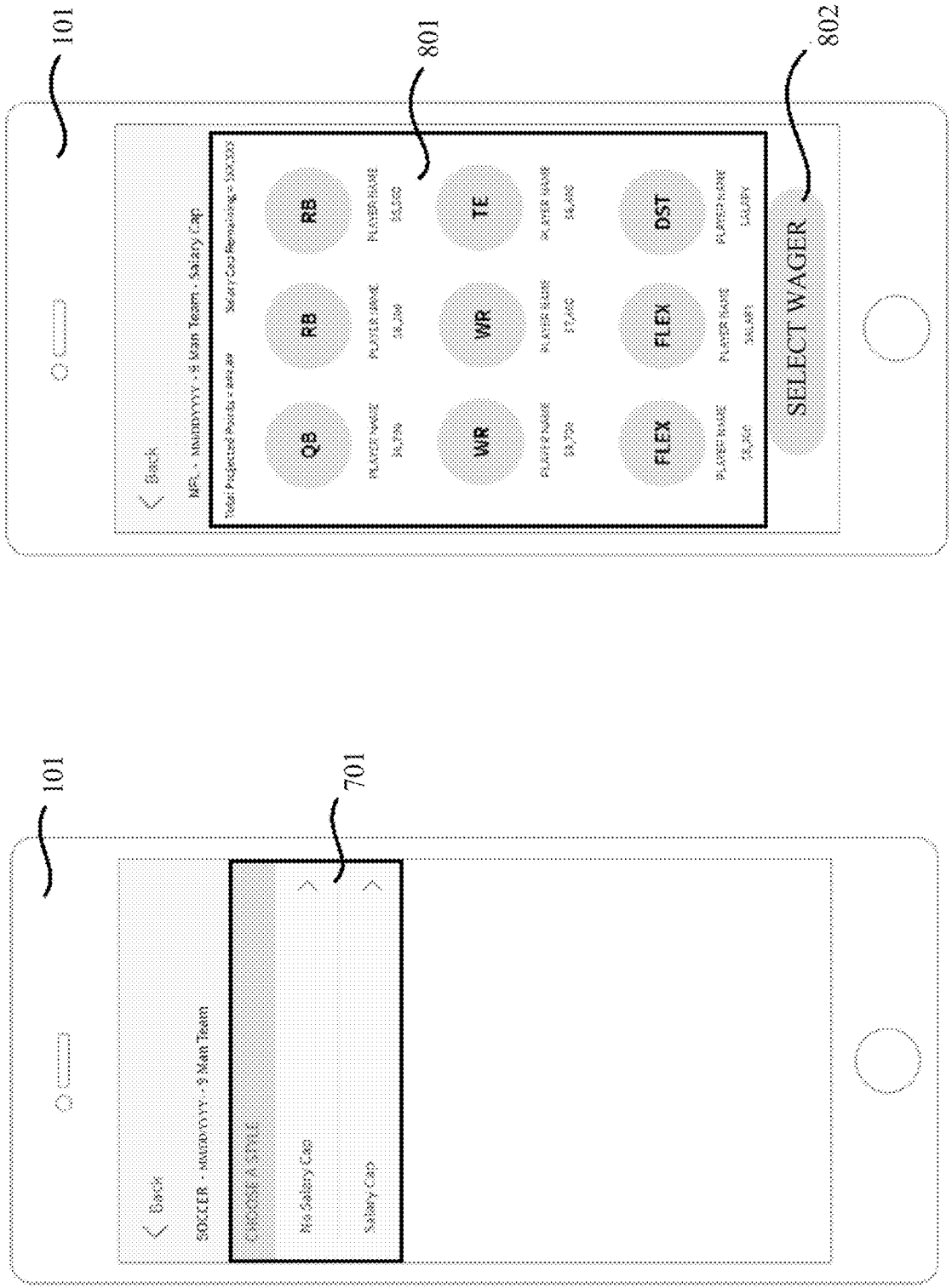

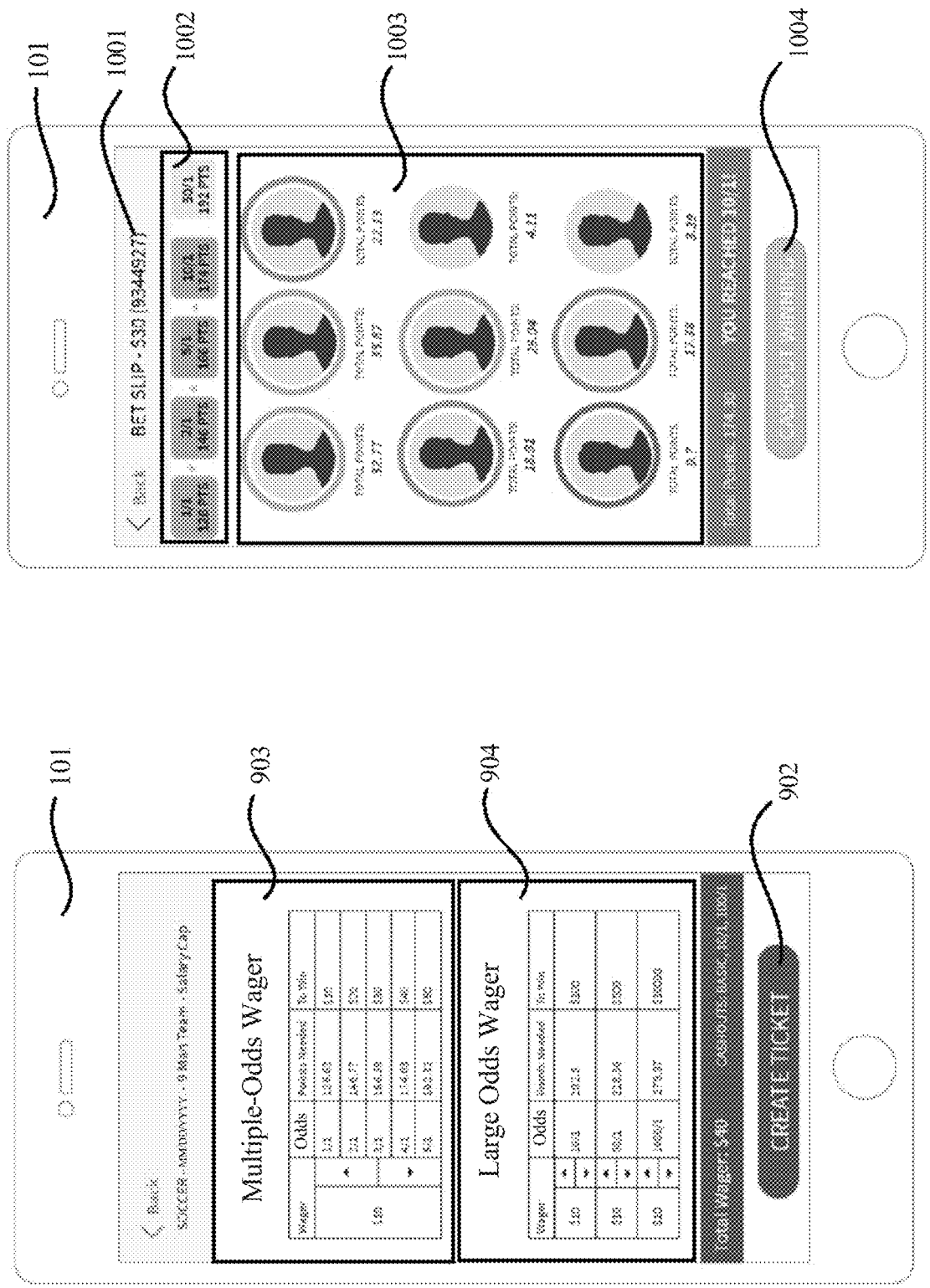

SYSTEMS AND METHODS FOR GENERATING PERSONALIZED WAGER OPPORTUNITIES BASED ON A FANTASY SPORTS CONTEST

CROSS-REFERENCE TO RELATED APPLICATIONS

This application is a continuation of U.S. patent application Ser. No. 16/550,838, filed Aug. 26, 2019, entitled "SYSTEMS AND METHODS FOR GENERATING PERSONALIZED WAGER OPPORTUNITIES BASED ON A FANTASY SPORTS CONTEST", which is hereby incorporated herein by reference in its entirety.

FIELD OF THE INVENTION

The present invention relates generally to gaming machines and methods for playing wagering games, and more particularly, to systems and methods for generating personalized wager opportunities based on a fantasy sports contest.

BACKGROUND OF THE INVENTION

Traditional fantasy sports competitions involve a group of players each selecting a set of athletes from different teams to create a fantasy team. Based on the individual athletes' performance, the fantasy teams generate points according to a set of rules. The players whose teams achieve the most points win prizes. Various types of fantasy sports contests are known. In general, players compete against each other to build the best team and win prizes. In some fantasy sports contests, there are many entrants and an individual's likelihood of winning the pool are low. Other problems exist, including the fact that some players use automated tools to obtain an advantage over other players. Other drawbacks are known and exist with traditional fantasy sports.

SUMMARY OF THE INVENTION

According to one aspect of the present invention, a gaming machine and a method of conducting personalized wagers based on a fantasy-sports contest on a gaming machine is disclosed. Players can first select athletes for a fantasy sports team. In various implementations, the gaming machine may be configured to obtain or generate a projected team score for a fantasy sports team (e.g., based on the historical performance of the athletes selected). Based on that projected team score, the gaming machine may be configured to generate a set of wager opportunities for that player. The wager opportunities may include a set of benchmark point levels and associated odds for the respective levels. The player can place one or more wagers based on whether the actual total score for the fantasy sports team created by the player exceeds one or more benchmark point levels and specify the amount to be wagered on one or more benchmark point levels (or wager opportunities). Thus, a player can make wagers that are won or lost based on the performance of the player's fantasy team compared to the benchmark point levels, regardless of how other players' fantasy sports teams perform.

According to one aspect of the present invention, the method comprises a player selecting a fantasy sports team roster in any of a variety of known manners. In particular, the player may first choose athletes for the fantasy sports team roster via a graphical user interface that shows various athletes for selection. Based on the athletes making up the roster of the selected fantasy team and their historical performance (and/or other factors), the system may obtain or generate a projected team score. The projected team score represents a predicted score that the fantasy team will achieve based on historical results of the set of athletes selected. This projected team score may be generated by the system/machine and/or obtained from a third party source.

Once the fantasy team is selected by the player, the system generates and presents via the user interface a set of wager opportunities based on the projected team score for the player's selected fantasy sports team. The wager opportunities may include a set of benchmark point levels and an associated payout amount for each level. The benchmark point levels may represent various point levels above, at, and/or below the projected team score. Payouts or odds may be calculated and presented via the user interface for each benchmark point level based on a determined likelihood that the team will achieve that point level. The user can then select one or more of the wager opportunities. Upon selection, the system may be configured to process the wagers, record them in a transactional database, and generate a ticket or other wager indicia (e.g. digital verification information) for the player.

Once the fantasy team is selected by the player, the system may generate and present via the user interface a set of wager opportunities based on the projected score for individual players on the user's selected fantasy sports team. The wager opportunities may include a set of benchmark point levels and an associated payout amount for each level. The benchmark point levels may represent various point levels above, at, and/or below the projected score for individuals on the user's fantasy sports team. Payouts or odds may be calculated and presented via the user interface for each benchmark point level based on a determined likelihood that the player will achieve that point level. The user can then select one or more of the wager opportunities. Upon selection, the system may be configured to process the wagers, record them in a transactional database, and generate a ticket or other wager indicia (e.g. digital verification information) for the player.

Any of the wager opportunities described herein may be based on a full game or a portion of a game (e.g., a period, quarter, half or other portion of a game). The system may prorate the predicted scores based on the relative portion of the game. For example, if a bet is based on the fantasy team's performance for half of a game the system may use a predicted score that is roughly half of the predicted score for an entire game.

Once the relevant underlying sporting events are completed, the system may be configured to calculate the actual score for the player's fantasy sports team based on the performance of the set of athletes making up the team. The system may be configured to determine if the actual score for the fantasy team exceeds the one or more benchmark point levels on which the player wagered. A winning wager is one where the actual score meets or exceeds the one or more benchmark point levels associated with that wager. For the winning wagers, the system may be configured to calculate a payout based on the amount of that wager and the payout/odds for that wager as indicated at the time the wager was placed.

According to yet another aspect of the invention, a computer readable storage medium is encoded with instructions for directing a gaming system or mobile platform to perform the features and/or processes described above. The executed instructions generate at least the graphical user interfaces for the game and perform the game machine functions recited herein. Additional aspects of the invention will be apparent to those of ordinary skill in the art in view of the detailed description of various embodiments, which is made with reference to the drawings, a brief description of which is provided below.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

FIGS. 3-11 depict examples of user interfaces of a gaming machine configured to enable a player to select a fantasy sports team and place wagers based on personalized wager opportunities generated for the fantasy sports team selected by the player, according to an implementation of the invention.

DETAILED DESCRIPTION OF THE INVENTION

The invention described herein relates to systems and methods for providing a technology platform configured to facilitate personalized wagers based on a fantasy sports wagering game. In various implementations, players (or users) may access the technology platform via a gaming machine. For example, a gaming machine may comprise a standalone gaming device, a user device, and/or other device configured to conduct personalized wagers based on a fantasy-sports game. In various implementations, players may first select athletes for a fantasy sports team. In various implementations, the gaming machine may be configured to obtain or generate the projected team score for the fantasy sports team (e.g., based on the historical performance of the athletes selected). Based on that projected team score, the gaming machine may be configured to generate a set of wager opportunities for that player. The wager opportunities may include a set of benchmark point levels and associated odds for the respective levels. The player can place one or more wagers based on whether the fantasy sports team's actual total score exceeds one or more benchmark point levels and specify the amount to be wagered on each wager. Thus, a player can make wagers that are won or lost based on the performance of the player's fantasy team compared to the benchmark point levels, regardless of how other players' fantasy sports teams perform.

It will be appreciated by those having skill in the art that the implementations described herein may be practiced without these specific details or with an equivalent arrangement. In various instances, well-known structures and devices are shown in block diagram form to avoid unnecessarily obscuring the implementations.

Example System Architecture

Figure 1:
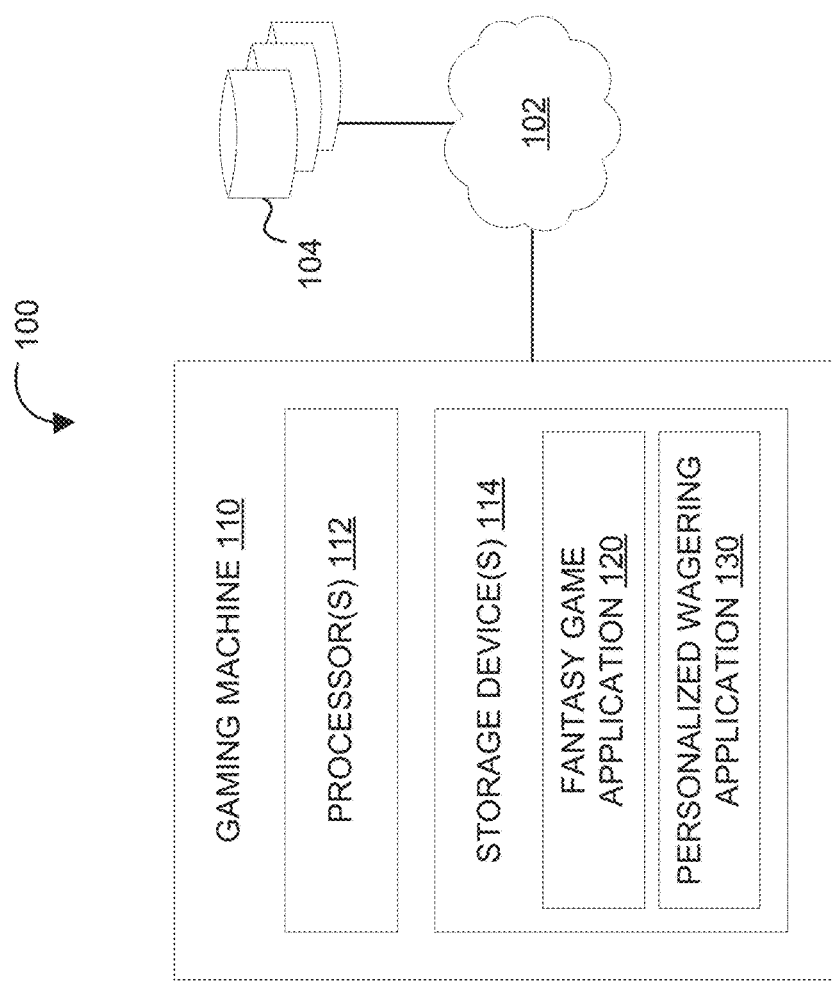
FIG. 1 depicts a block diagram of an example of a system for creating and managing personalized wagers based on a fantasy sports contest, according to an implementation of the invention.

FIG. 1 illustrates a block diagram of an example of a system 100 for creating and managing personalized wagers based on a fantasy sports contest, according to an implementation of the invention. In various implementations, system 100 may include one or more storage devices 104, a gaming machine 110, and/or other components. Gaming machine 110 may be configured as a server device (e.g., having one or more server blades, processors, etc.), a gaming console, a handheld gaming device, a personal computer (e.g., a desktop computer, a laptop computer, etc.), a smartphone, a tablet computing device, an Internet of Things (IoT) device, a wearable device, and/or other device that can be programmed to facilitate personalized wagers based on a user-defined fantasy sports team. For example, gaming machine 110 may comprise a standalone device in a casino, a counter-top or bar-top gaming device, a portable or handheld device, and/or other device configured to facilitate personalized wagers based on a user-defined fantasy sports team.

Gaming machine 110 may include one or more processors 112 (also interchangeably referred to herein as processors 112, processor(s) 112, or processor 112 for convenience), one or more storage devices 114, and/or other components. Processors 112 may be programmed by one or more computer program instructions. For example, processors 112 may be programmed by fantasy game application 120, personalized wagering application 130, and/or other instructions that program gaming machine 110 to perform various operations, each of which are described in greater detail herein. In various implementations, the instructions that program gaming machine 110 to perform various operations may be stored on one or more storage device 114 and/or storage device. As used herein, for convenience, the various instructions will be described as performing an operation, when, in fact, the various instructions program the processors 112 (and therefore gaming machine 110) to perform the operation.

Fantasy game application 120 may be configured to create and manage a fantasy sports contest. In various implementations, fantasy game application 120 may be configured to enable a user to select individual athletes to build a fantasy sports team. As used herein, "user" and "player" may be used interchangeably to refer to an individual interacting with system 100 in order to participate in a fantasy sports contest and/or place wagers that are based on a specific fantasy sports team selected by that user/player. As described further herein, fantasy game application 120 may be configured to enable a user to select athletes to build a fantasy sports team in any manner now known or future developed. In various implementations, fantasy game application 120 may be configured to obtain or generate a projected team score for a fantasy sports team built by a user.

Personalized wagering application 130 may be configured to conduct personalized wagers based on a fantasy-sports contest. In various implementations, personalized wagering application 130 may be configured to facilitate personalized wagering based on a fantasy sports team built by a user. For example, personalized wagering application 130 may be configured to facilitate personalized wagering based on a fantasy sports team created via fantasy sports application 120. In various implementations, personalized wagering application 130 may be configured to generate a set of wager opportunities for a player based on the fantasy sports team built by that player. For example, the wager opportunities may be based on a projected team score for the fantasy sports team. The wager opportunities may include a set of benchmark point levels and associated odds for the respective levels. In various implementations, personalized wagering application 130 may be configured to receive user input indicating a wager to be placed based on whether the actual total score for the fantasy sports team exceeds one or more of the benchmark point levels and specifies the amount to be wagered for the one or more benchmark point levels. Thus, via personalized wagering application 130, a player can make wagers that are won or lost based on the performance of the player's fantasy team compared to the benchmark point levels, regardless of how other players' fantasy sports teams perform.

In various implementations, personalized wagering application 130 may be configured to facilitate personalized wagering based on any fantasy sports team. For example, personalized wagering application 130 may be configured to facilitate personalized wagering based on any computer-generated or user-defined fantasy sports team. In some implementations, personalized wagering application 130 may be configured to facilitate personalized wagering based on a user-selected fantasy sports team and/or a fantasy sports team selected by another user. For example, system 100 may enable a user to select a fantasy sports team generated by another user via a user interface. The user interface may include a list of fantasy sports teams entered into a fantasy sports contest (e.g., a third-party fantasy sports tournament lobby and/or other fantasy sports contest). In an example implementation, personalized wagering application 130 may be configured to facilitate personalized wagering based on the selected fantasy sports team (e.g., by generating one or more wager opportunities based on the fantasy sports team generated by the other user). In some implementations, wagers placed via wager opportunities generated based on fantasy sports team selected by other users may have altered projections and/or benchmark point levels. For example, when a user selects a fantasy sports team generated by another user for which to have one or more wager opportunities generated, the projections and/or benchmark point levels may be greater than if the user had selected the fantasy sports team themselves.

In various implementations, personalized wagering application 130 may be configured to operate independently (e.g., as a stand-alone system) or be utilized as a "bolt-on" addition to any known fantasy sports contest application and/or other third party application. For example, personalized wagering application 130 may be configured to interface with any known fantasy sports contest application and/or other third party application through which a user may define a fantasy sports team by selecting a set of individual athletes. In an example implementation, via system 100, a user may be able to log into a third-party website or application (e.g., DraftKings.com, FanDuel.com, and/or other third-party website or application), create a fantasy sport team, enter their fantasy sports team into a tournament, and be presented with the option to "Place a Wager" on their team, as described further herein. In some implementations, personalized wagering application 130 may be configured to interface with one or more third party fantasy sports contest applications via a network (e.g., the Internet) and via one or more appropriate interfaces (e.g., an Application Programming Interface (or API)) for the one or more third party fantasy sports contest applications. As such, personalized wagering application 130 may be configured to facilitate personalized wagering based on any fantasy sports team constructed via fantasy game application 120 and/or one or more other fantasy sports contest applications.

Figure 2:
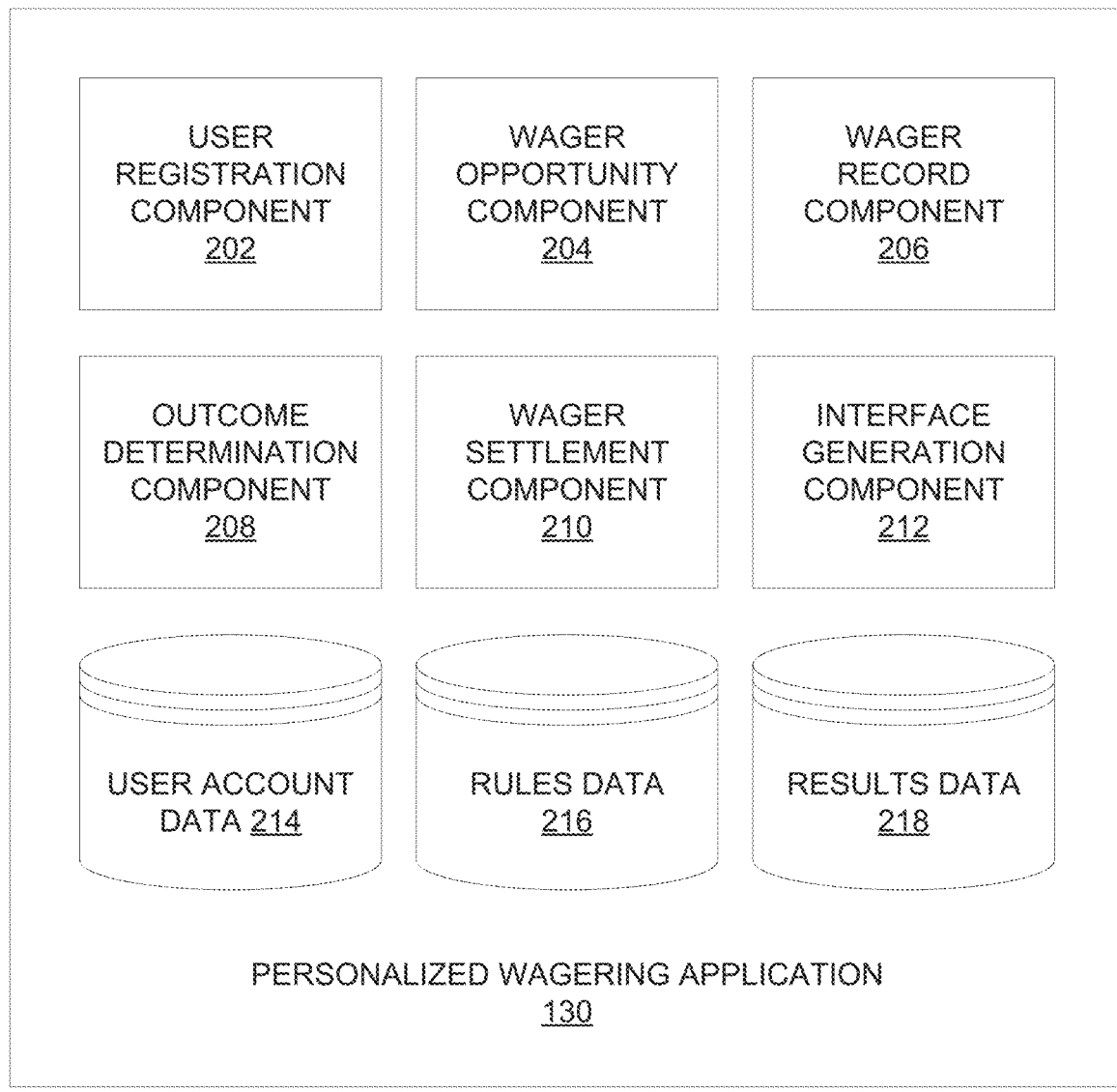
FIG. 2 depicts a block diagram of an example of a personalized wagering application, according to an implementation of the invention.

In various implementations, personalized wagering application 130 may program gaming machine 110 to facilitate personalized wagering based on a selected fantasy sports team using all or a portion of the components of personalized wagering application 130 illustrated in FIG. 2.

Personalized Wagering Application

FIG. 2 depicts a block diagram of an example of a personalized wagering application 130, according to an implementation of the invention. Personalized wagering application 130 may include a user registration component 202, a wager opportunity component 204, a wager record component 206, an outcome determination component 208, a wager settlement component 210, an interface generation component 212, a user account data datastore 214, a rules data datastore 216, a results data datastore 218, and/or other components. One or more of user registration component 202, wager opportunity component 204, wager record component 206, outcome determination component 208, wager settlement component 210, interface generation component 212, user account data datastore 214, rules data datastore 216, and results data datastore 218 may be coupled to one another or to components not shown in FIG. 2.

User registration component 202 may be configured to register one or more users with system 100. In various implementations, user registration component 202 may be configured to register one or more users with system 100 by creating user accounts for the one or more users. In various implementations, each user account may be associated with a single user that has registered with system 100 and may comprise information associated with the user. For example, the information associated with the user may include identifying information (e.g., a first name, a last name, a photo associated with the account, and/or other identifying information), contact information (e.g., a phone number, a mailing address, an email address, a webpage, and/or other contact information), preference information (e.g., contact preferences, newsletter preferences, favorite teams and/or players, preferred rules, and/or other preference information), financial account information (e.g., bank account information, PayPal account details, cryptocurrency wallet details, and/or other financial information), credit card information (e.g., a credit card number, an expiration date, a security code, a billing address, and/or other credit card information), contest participation information (e.g., one or more fantasy sports contests to which the user is a participant, results from one or more previous fantasy sports contests, and/or other contest participation information), wager information (e.g., a wager amount, a benchmark point level of the wager, a potential payout if the benchmark point level was reached, a total payout for a wager, and/or other information associated with one or more wagers), account balance information (e.g., a current balance, one or more payment methods, one or more payout methods, and/or other account balance information), and/or other information associated with the user. In some implementations, a user may be required to register with system 100 before placing one or more wagers via personalized wagering component 130. For example, user registration component 202 may be configured to prevent unregistered users from placing one or more wagers via personalized wagering component 130.

In various implementations, user registration component 202 may be configured to generate a profile for each user based on the information associated with each individual user. In various implementations, user registration component 202 may be configured to update user accounts and/or profiles for the one or more users. In various implementations, user registration component 202 may be configured to create and/or update a user account responsive to user input. For example, a user account may be created and/or updated based on a user input communicating information associated with the user. In some implementations, user registration component 202 may be configured to create and/or update a user account responsive to user input received via a graphical user interface of gaming machine 110. In some implementations, user registration component 202 may be configured to create and/or update a user account automatically based on information accessible to system 100. In various implementations, user registration component 202 may be configured to store user accounts in user account data datastore 214.

Wager opportunity component 204 may be configured to generate one or more wager opportunities based on a fantasy sports team. For example, wager opportunity component 204 may be configured to generate a set of wager opportunities comprising one or more wager opportunities for a fantasy sports team. A wager opportunity may comprise a benchmark point level and associated odds for the benchmark point level. In various implementations, wager opportunity component 204 may be configured to generate a set of wager opportunities by determining respective benchmark point levels and odds for each of the set of wager opportunities. Accordingly, based on an amount of a wager, each generated wager opportunity may include a benchmark point level and a payout for the wager opportunity, wherein the payout is based on the wager amount and the odds associated with the wager opportunity.

A benchmark point level may comprise a potential team score that determines whether or not a wager placed based on that benchmark point level is successful. In various implementations, benchmark point levels may be determined based on a projected team score for a given fantasy sports team. In some implementations, benchmark point levels may comprise team scores below, at, and/or above a projected team score for a fantasy sports team. In some implementations, a payout of a wager may only be paid out if the actual team score for a fantasy sports team meets and/or exceeds a benchmark point level associated with the wager opportunity upon which the wager was placed. In some implementations, a payout of a wager may only be paid out if the actual team score for a fantasy sports team does not meet or exceed a benchmark point level associated with the wager opportunity upon which the wager was placed.

In various implementations, wager opportunity component 204 may be configured to obtain a projected team score for a selected fantasy sports team. For example, wager opportunity component 204 may be configured to obtain a projected team score for a selected fantasy sports team from fantasy game application 120. In some implementations, wager opportunity component 204 may be configured to generate a projected team score for a fantasy sports team. For example, wager opportunity component 204 may be configured to generate a projected team score for a fantasy sports team based on the historical performance of the individual athletes on the fantasy sports team. In various implementations, a projected team score for a fantasy sports team is based on one or more underlying sports events associated with that fantasy sports team during a predefined time period. For example, a particular fantasy sports contest may be associated with a predefined time period, and the projected team score for a fantasy team may be obtained, determined, and/or otherwise generated based on the underlying sports events occurring during that time period in which the athletes making up the fantasy sports team are participating in. In some implementations, projected team scores may be generated based at least in part on wagers placed by other users. For example, the number of wagers placed involving one or more athletes may affect the projected team score upon which generated wager opportunities are based.

In various implementations, wager opportunity component 204 may be configured to determine benchmark point levels for a set of wager opportunities for a fantasy sports team. For example, wager opportunity component 204 may be configured to determine benchmark point levels for a set of wager opportunities based on the projected team score for the fantasy sports team. In various implementations, a set of benchmark point levels (and corresponding wager opportunities) for a given fantasy sports team may be determined based on a predefined number of benchmark point levels to provide. For example, different sports may include a different predefined number of wager opportunities to provide. In some implementations, a set number of benchmark point levels may be determined based on the number of wager opportunities to provide. In some implementations, wager opportunity component 204 may be configured to determine benchmark point levels for a set of wager opportunities for a fantasy sports team based on wagers placed by other users involving one or more athletes of the selected fantasy sports team. For example, the number of wagers placed involving one or more athletes may affect the benchmark point levels determined for a set of generated wager opportunities.

In various implementations, wager opportunity component 204 may be configured to determine odds for a set of wager opportunities for a fantasy sports team. For example, wager opportunity component 204 may be configured to determine odds for a set of wager opportunities based on the relation between the respective benchmark point levels for the individual wager opportunities and the projected team score.

In various implementations, wager opportunity component 204 may be configured to determine a potential payout for one or more wager opportunities based on odds for each of the one or more wager opportunities. For example, a user may enter an amount to potentially wager on one or more wager opportunities. Based on the odds for each of the one or more wager opportunities and the amount to potentially wager, wager opportunity component 204 may be configured to determine a potential payout for the one or more wager opportunities. In some implementations, wager opportunity component 204 may be configured to determine a potential payout for one or more wager opportunities based on odds for each of the one or more wager opportunities and a default (or standard) wager amount. In some implementations, the default (or standard) wager amount may be obtained (or determined) based on profile information for a user.

In various implementations, wager opportunity component 204 may be configured to generate one or more wager opportunities based on a fantasy sports team and fantasy sports contest defined by a user. For example, as described further herein, a user may define one or more contest parameters that define a fantasy sports contest. Based on the particular fantasy sports contest defined by the user (i.e., via the one or more contest parameters) and the corresponding fantasy sports team selected by the user, wager opportunity component 204 may be configured to generate one or more wager opportunities based on that fantasy sports team. For example, the benchmark point levels of the one or more wager opportunities may be based on one or more scoring parameters for a particular fantasy sports contest. In some implementations, a user may elect to receive one or more wager opportunities for one or more predefined fantasy sports contests defined by one or more predefined contest parameters. Based on the one or more predefined contest parameters for a particular fantasy sports contest, wager opportunity component 204 may be configured to generate one or more wager opportunities based on the fantasy sports team selected by a user for that particular fantasy sports contest.

In an example implementation, one or more contest parameters for a fantasy sports contest may define one or more athletes eligible for selection and user-defined scoring rules for the fantasy sports contest. Based on the one or more contest parameters, available athletes for inclusion in a fantasy sports team selected by a user may be displayed via a user interface generated by interface generation component 212. In some implementations, only the athletes eligible for selection may be displayed. For example, contest parameters may indicate that each team may consist of only pitchers (in the case of a baseball-related contest), only running backs (in the case of a football-related contest, and/or otherwise specify specific rules governing the make-up of each fantasy sports team in the fantasy sports contest. Based on the fantasy sports team selected by the user, wager opportunity component 204 may be configured to generate one or more wager opportunities based on the projected team score for the fantasy sports team selected by the user. The projected team score may be based on the scoring rules defined by the one or more contest parameters for the fantasy sports contest for which the fantasy sports team was selected. In order to determine the outcome of a wager placed by the user, outcome determination component 208 may be configured to determine the actual total score for the fantasy sports team based on those same scoring rules, as described further herein.

In various implementations, wager opportunity component 204 may be configured to generate one or more wager opportunities before and/or after a particular sporting event has commenced. In other words, a user may create a fantasy sports team that includes players participating in sporting events that have already commenced and place wagers on that fantasy sports team via one or more wager opportunities generated by wager opportunity component 204 despite the fact that a sporting event upon which the fantasy sports contest is based has already begun. In an example implementation in which one or more wager opportunities are generated for a fantasy sports team with athletes participating in one or more sporting events after at least one of the sporting events has begun, both the projected scores used to generate the one or more wager opportunities and the outcome of wager(s) placed based on the one or more wager opportunities may be determined based on the status of the sporting event at the time the wager opportunities are generated and/or the statistics of the one or more athletes involved in the ongoing sporting event at the time the wager opportunities are generated. Accordingly, system 100 may enable a user to place one or more wagers on a fantasy sports team based on sporting events that have already started and/or sporting events that have yet to start. As such, system 100 may enable "live betting" using the techniques described herein.

In various implementations, wager opportunities generated by wager opportunity component 204 may be presented to a user via a user interface of gaming machine 110 generated by interface generation component 212. For example, the user interface may be configured to display the benchmark point level, the odds, potential payout based on a standard wager amount, an indication of wager opportunity popularity, and/or other information associated with individual ones of a set of wager opportunities. Via the user interface, user input may be received that causes one or more wagers to be placed based on the wager opportunities generated by wager opportunity component 204. In some implementations, the user input received that causes one or more wagers to be placed based on a user-defined fantasy sports team may comprise at least second user input, wherein the first user input received via the one or more user interfaces generated by interface generation component 212 may comprise user input building the fantasy sports team by selecting a set of athletes for the fantasy sports team.

Wager record component 206 may be configured to process wagers made by users based on wager opportunities generated based on a fantasy sports team selected by the respective users. For example, via the systems and methods described herein, a player can place one or more wagers based on whether the fantasy sports team's actual total score exceeds one or more benchmark point levels and specify the amount to be wagered on each wager. Thus, a player can make wagers that are won or lost based on the performance of the player's fantasy team compared to the benchmark point levels, regardless of how other players' fantasy sports teams perform. In various implementations, the user can select one or more of the wager opportunities. Upon selection, the system may be configured to process the wagers, record them in a transactional database, and generate a ticket or other wager indicia (e.g. digital verification information) for the player.

In various implementations, wager record component 206 may be configured to record one or more wagers placed by a user based on user input received via a user interface. For example, wager record component 206 may be configured to record one or more wagers placed by a user in a database in association with a user account of the user. In some implementations, each wager placed based on one or more selected wager opportunities may be stored as a hash of the fantasy sports team and the respective odds for the one or more selected wager opportunities. A record of wagers placed (or wager indicia) may be stored as hashes of the fantasy team data and wager amount, verifiable certificates, encoded data sequences, data elements, printed/printable tickets, quick response (QR) codes, blockchain elements, tokens, and/or other data records. For example, wager record component 206 may be configured to record each transaction related to system 100 (e.g., payments made from one or more financial accounts or via credit cards of users, wagers placed, wager outcomes determined, payouts distributed, and/or other transactions) to a distributed ledger shared by one or more nodes on a network.

In various implementations, wager record component 206 may be configured to receive wagers placed by a user that include a selection of multiple wager opportunities. For example, a user may place a "parlay" wager that includes a single wager based on the occurrence of multiple conditions. In some implementations, a user may place a wager that a selected fantasy sports team will or will not achieve a benchmark point level. In other words, a user may place wagers based on wager opportunities generated by wager opportunity component 204 by selecting an "over/under" on the benchmark point level. For example, a user may select a wager opportunity, provide a wager amount, and indicate whether the user wagers that the actual team score for the fantasy sports team will or will not achieve the benchmark point level associated with the selected wager opportunity.

In various implementations, wager record component 206 may be configured to provide a record of one or more wagers placed by a user. For example, wager record component 206 may be configured, upon request by a user, to provide an indication of one or more current (or pending) wagers and/or one or more prior wagers (i.e., wagers for which an outcome has already been determined). In various implementations, a user may view wagers placed via a graphical user interface. For example, an indication of the one or more wagers placed may be provided via a graphical user interface. The indication of the one or more wagers placed may include an indication of a potential payout based on an actual total score for the fantasy sports team. In various implementations, wager record component 206 may be configured to provide a payments interface in which a user may identify financial accounts from which to send and receive money associated with one or more wagers. In some implementations, a user may submit payment associated with one or more wagers and/or receive an amount of a pay out associated with one or more wager opportunities via a bank account, a PayPal account, a cryptocurrency wallet, a credit card, and/or other form of financial account.

Outcome determination component 208 may be configured to determine an outcome of one or more wagers placed based on wager opportunities generated for a user selected fantasy sports team. For example, as underlying sports events associated with a fantasy sports contest occur and/or are completed, outcome determination component 208 may be configured to determine a score for individual athletes of the fantasy sports team and an actual total score for the fantasy sports team based on the score for the individual athletes of the fantasy sports team. In other words, once the relevant underlying sporting events are completed, outcome determination component 208 may be configured to calculate the actual score for the player's fantasy sports team based on the performance of the set of athletes making up the team. Outcome determination component 208 may be configured to determine if the actual score for the fantasy team exceeds the one or more benchmark point levels on which the player wagered. A winning wager may comprise one where the actual score meets or exceeds (or does not meet or exceed) the one or more benchmark point levels associated with that wager. For the winning wagers, outcome determination component 208 may be configured to calculate a payout based on the amount of that wager and the payout/odds for that wager as indicated at the time the wager was placed.

Wager settlement component 210 may be configured to pay out one or more wagers based on the outcome of the one or more wager opportunities. For example, responsive to a determination that the actual total score for a fantasy sports team has met at least one benchmark point level associated with a wager, an amount of the pay out may be transferred to an account of the user. Upon request, a user may cause an amount in an account of the user to be transferred to one or more financial accounts. For example, as described above, a user may submit payment associated with one or more wagers and/or receive an amount of a pay out associated with one or more wager opportunities via a bank account, a PayPal account, a cryptocurrency wallet, a credit card, and/or other form of financial account.

As indicated above, a user may submit payment associated with one or more wagers and/or receive an amount of a pay out associated with one or more wager opportunities via a cryptocurrency wallet. Accordingly, system 100 may be configured to accept from users and/or pay out to users an amount in cryptocurrency (e.g., Bitcoin, Litecoin, Ethereum, and/or other type of cryptocurrency). In some implementations, a user may submit and/or receive payment in the form of a token generated by system 100. For example, system 100 may be configured to generate system-specific digital currency—a token—with which users may exchange for participation in one or more fantasy sports contest, use as payment for one or more wagers placed via system 100, receive payment from system 100, and/or otherwise interact with system 100. In some implementations, tokens generated by system 100 may comprise a set of cryptographic, blockchain-based tokens. The tokens may have a specified set of functions and/or parameters, which can be programmed in a known manner. The tokens may be represented by a blockchain public key and private key pair. As one example, the tokens may comprise a set of tokens that comply with the ERC-20 standard. The ERC-20 standard is a common set of rules for tokens issued via Ethereum smart contracts. In some implementations, the tokens may include functions that represent a set of rights or entitlements with respect to system 100. In some implementations, tokens generated by system 100 may be tradable on a secondary market. In other implementations, tokens generated by system 100 may be restricted to use only with system 100.

Interface generation component 212 may be configured to generate and manage a user interface presented via a graphical user interface. In various implementations, interface generation component 212 may be configured to cause a user interface to be displayed via a display of gaming machine 110. In various implementations, the user interface may comprise an online interface. In various implementations, interface generation component 212 may be configured to enable the receipt of user input via the user interface. In various implementations, interface generation component 212 may be configured to generate and manage a series of user interfaces through which a user may select individual athletes for a fantasy sports team, view one or more personalized wager opportunities based on the selected fantasy sports team, select one or more wager opportunities on which to place a wager, view the outcome of one or more wagers placed, and/or otherwise interact with the gaming machine as described herein. For example, interface generation component 212 may be configured to generate and manage one or more user interfaces the same as or similar to user interfaces depicted in FIGS. 3-11, which are described further herein. Various features of personalized wagering application 130 are described further herein with respect to the graphical user interfaces depicted in FIGS. 3-11.

User account data datastore 214 may be configured to store user account data for one or more users registered with system 100. In various implementations, user account data for each user may comprise information associated with the user. For example, the information associated with the user may include identifying information, contact information, preference, financial account information, credit card information, contest participation information, wager information, account balance information, and/or other information associated with the user. In various implementations, user account data for each user may comprise a profile of the user generated based on and/or comprising the information associated with the user.

Rules data datastore 216 may be configured to store contest parameters for fantasy sports contests. The contest parameters may indicate predefined roster requirements, available athletes from which a player may select to build a fantasy sports team (e.g., an indication of one or more athletes, teams, games, leagues, and/or sports from which a user may select individual athletes to build a fantasy sports team), scoring parameters, and/or other contest parameters that may affect how a fantasy sports team is built and/or evaluated.

Results data datastore 218 may be configured to store outcomes of wagers placed by users. For example, results data datastore 218 may be configured to store for each wager an indication of the wager amount, whether the benchmark point level was reached, a potential payout if the benchmark point level was reached, the total payout for each wager, and/or other information associated with the wager.

Fantasy Game Application

In various implementations, fantasy game application 120 may be configured to enable a user to build a fantasy sports team comprising individual athletes from a single league (e.g., the NFL, NBA, and/or other sports league) or individual athletes from multiple leagues participating in a single sport. For example, a user may select from available athletes participating in the English Premier League, La Liga, and/or one or more other soccer/football leagues. In some implementations, fantasy game application 120 may be configured to enable a user to build a fantasy sports team comprising individual athletes from multiple leagues and/or participating in multiple sports. In other words, the fantasy sports contest described herein is in no way limited to any single sport, league, or combination thereof. As used herein, "available athletes" may comprise individual athletes predefined as being available for selection in a given fantasy sports contest.

In various implementations, fantasy game application 120 may be configured to obtain contest parameters for a given fantasy sports contest. Individual fantasy sports contests may be defined by one or more contest parameters. Contest parameters may indicate predefined roster requirements, available athletes from which a player may select to build a fantasy sports team (e.g., an indication of one or more athletes, teams, games, leagues, and/or sports from which a user may select individual athletes to build a fantasy sports team), scoring parameters, and/or other contest parameters that may affect how a fantasy sports team is built and/or evaluated. Predefined roster requirements may indicate a number of players that is required to build a fantasy sports team, predefined positions for which individual athletes must be selected, and/or other roster requirements. For example, for a given fantasy sports contest, a user may be required to select (or "fill") a team with nine (9) athletes, a team with six (6) athletes, a team with (3) athletes, a team with one (1) athlete, and/or other fantasy sports team complying with the requirements specified by the one or more contest parameters. Scoring parameters may comprise one or more rules indicating how the performance of an individual athlete is scored, how the actual score for a fantasy team is determined, and/or other scoring parameters. For example, the scoring parameters may indicate a value associated with a series of statistical categories. Based on the statistics of a given athlete in one or more sporting events and the value associated with each of a series of one or more statistical categories, fantasy game application 120 may be configured to determine the score for an individual athlete. Based on the score for each athlete making up a fantasy sports team, fantasy game application 120 may be configured to determine the team score for the fantasy sports team.

In various implementations, fantasy game application 120 may be configured to generate a series of graphical user interfaces through which a user may identify one or more contest parameters, build a fantasy sports team by selecting individual athletes, and/or otherwise interact with fantasy game application 120. For example, fantasy game application 120 may be configured to generate a series of graphical user interfaces to be displayed via a user interface of gaming machine 110. Various features of graphical user interfaces generated by fantasy game application 120 are described further herein with respect to FIGS. 3-8.

In various implementations, fantasy game application 120 may be configured to build a fantasy sports team comprising a set of individual athletes based on user input selecting the individual athletes. For example, fantasy game application 120 may be configured to generate one or more graphical user interfaces to be displayed on a user interface. In various implementations, the one or more graphical user interfaces generated by fantasy game application 120 may be configured to display available athletes and/or enable a user to search for available athletes by entering text and/or selecting available teams, games, leagues, and/or sports. In various implementations, the one or more graphical user interfaces generated by fantasy game application 120 may be configured to receive user input selecting athletes for a fantasy sports team. In some implementations, fantasy game application 120 may be configured to enable a user to select athletes to build a fantasy sports team in any manner now known or future developed.

In various implementations, fantasy game application 120 may be configured to obtain a projected team score for a fantasy sports team built by a user. The projected team score may comprise a predicted score that the fantasy team will achieve in a predefined sporting event or set of sporting events based on historical results of the set of athletes selected and/or other factors. For example, a projected team score may be based on the one or more opponents of athletes on the fantasy sports team, the historical performance of the athletes over a predefined time period, external conditions affecting a sporting event involving the athletes on the fantasy sports team (e.g., weather, time of day, location, and/or other conditions), external factors affecting athletes involved in a sporting event (e.g., injury status, contract status, news coverage, and/or other external factors that may affect that athlete or another athlete's performance), social media or other popularity-based sentiments surrounding upcoming sporting events or athletes participating in the upcoming sporting events, and/or other factors that may affect or indicate the performance of the one or more athletes on the fantasy sports team and/or indicate the likelihood one or more users may select a particular player for their fantasy sports team. In some implementations, a projected team score may be based on a date or date range associated with a fantasy sports team.

In various implementations, fantasy game application 120 may be configured to receive a projected team score for a fantasy sports team built by a user. For example, fantasy game application 120 may be configured to receive a projected team score for a fantasy sports team from one or more third party and/or remote sources and/or generate a projected team score for a fantasy sports team based on historical results of the set of athletes comprising the fantasy sports team and/or other factors. In various implementations, fantasy game application 120 may be configured to receive a projected team score for a fantasy sports team from one or more third party and/or remote sources. For example, fantasy game application 120 may be configured to request a projected team score from a third party and/or remote source based on a fantasy sports team built by a user.

In various implementations, fantasy game application 120 may be configured to generate a projected team score for a fantasy sports team built by a user. For example, fantasy game application 120 may be configured to generate a projected team score for a fantasy sports team based on based on historical results of the set of athletes comprising the fantasy sports team and/or other factors. In some implementations, fantasy game application 120 may be configured to receive (or request) projected scores for individual athletes from one or more third party and/or remote sources and generate the projected team score for the fantasy sports team based on the obtained projected scores for the individual players. In some implementations, fantasy game application 120 may be configured to generate projected scores for individual athletes and determine the projected team score for the fantasy sports team based on the generated projected scores for the individual athletes. In other words, based on the athletes making up the roster of the selected fantasy team and their historical performance (and/or other factors), the system may receive, generate, or otherwise obtain a projected team score.

In some implementations, fantasy game application 120 may be configured to obtain or generate projected scores for individual athletes on a user's fantasy sports team and provide a user interface that allows the player to place wagers on the performance of individual athletes of the fantasy team. In some implementations, fantasy game application 120 may be configured to generate for each athlete on the user's fantasy sports team a predicted score based on historical performance and a set of benchmark point levels and an associated payout amount for each benchmark point level (e.g. 5:1 Kevin Love beats 24.7 pts) for the time, place, and/or sports event already selected by the player. The player could then place a wager on any or all of the benchmark point levels for the individual athlete.

As described herein, wager opportunities may be based on a full game or a portion of a game (e.g., a period, quarter, half or other portion of a game). In some implementations, fantasy game application 120 may be configured to prorate the predicted scores based on the relative portion of the game. For example, if a bet is based on the fantasy team's performance for half of a game, fantasy game application 120 may be configured to use a predicted score that is roughly half of the predicted score for an entire game.

In some implementations, fantasy game application 120 may be configured to receive (or request) projected scores for less than a full game or sports event. This implementation the fantasy game application 120 may provide an additional option to select the portion of the game to be covered by the wager (e.g., selection of a quarter, a half, a period, or a specific time window, or selection of time windows based on other events such as when a specific player is on the field. An additional screen may be presented before or after the player's selection of the fantasy team roster. A dropdown menu may be presented within the team roster screen upon selection of an athlete of the fantasy team by the player. The selected period for the wager will then be used by the fantasy game application 120 or system to generate or adapt the set of benchmark point levels and an associated payout amount for each benchmark point level associated with the fantasy team.

In some implementations, the fantasy game application 120 will allow the player to select a specific time period for a wager on an individual athlete. The specific time period may be that selected for the fantasy team as a whole or a different time period selected for the wager on the individual athlete. The different time period selected for the individual athlete may be presented in a dropdown menu within the athlete wager selection screen or may be presented as a separate screen. The selected period for the wager on the individual athlete will then be used by the fantasy game application 120 or system to generate or adapt the set of benchmark point levels and an associated payout amount for each benchmark point level. The player may then select one or more of the wagers on the individual athlete which have been modified by the period selection.

In some implementations, fantasy game application 120 may be configured to generate a projected team score based at least in part on wagers placed by other players. For example, fantasy game application 120 may be configured to interface with personalized wagering application 130 to receive an indication of one or more wagers placed that include individual athletes. Based on the outcome of the wagers and the athletes involved in the one or more wagers, fantasy game application 120 may be configured to generate a projected team score that takes into account the frequency with which a given athlete, or set of athletes, are involved in winning (or losing) wagers.

In various implementations, fantasy game application 120 may be configured to obtain information stored in database (s) of one or more storage devices 104. For example, information stored on one or more storage devices 104 be used to obtain a projected team score for a fantasy sports team built by a user. In some implementations, the information may include historical results of the set of athletes comprising the fantasy sports team and/or other factors.

In various implementations, system 100 may operate as a stand-alone system and include both fantasy game application 120 and personalized wagering application 130. As described above, in various implementations, personalized wagering application 130 may be configured to operate independently (e.g., as a stand-alone system). In other implementations, personalized wagering application 130 may be utilized as a "bolt-on" addition to any known fantasy sports contest application and/or other third party application. Accordingly, fantasy game application 120 may comprise a component of system 100 (i.e., in the case of a stand-alone system) and/or any known fantasy sports contest application and/or other third party application with which personalized wagering application 130 is configured to interface with, as described herein.

Example User Interfaces

FIGS. 3-11 depict examples of user interfaces of a gaming machine configured to enable a player to select a fantasy sports team and place wagers based on personalized wager opportunities generated for the fantasy sports team selected by the player, according to an implementation of the invention. For example, the user interfaces depicted in FIGS. 3-11 may comprise one or more interfaces generated by interface generation component 212. In various implementations, the technology platform configured to facilitate personalized wagers based on a fantasy sports wagering game may be provided with or without one or more of the example user interfaces depicted and described herein.

Figure 3:
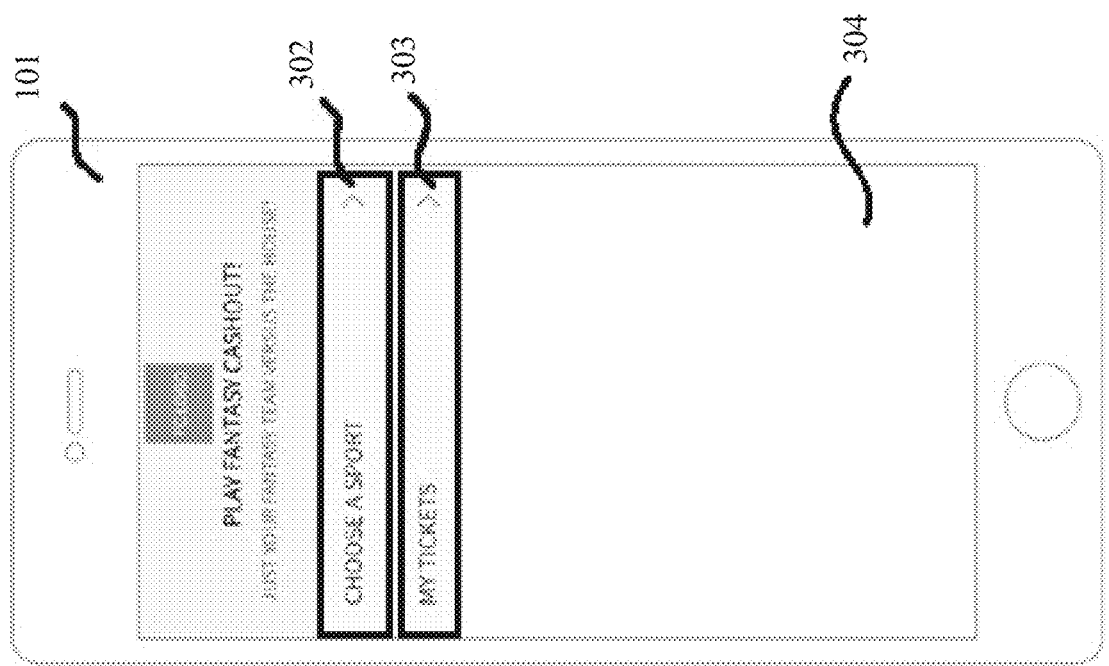

FIG. 3 depicts an example of a user interface of a gaming machine configured to enable a player to select one or more sports from which to build a fantasy sports team or view prior wagers placed, according to an implementation of the invention. In various implementations, a display 304 of gaming machine 110 may include a start or introductory screen that allows a player using gaming machine 110 to select from one or more options on a menu. For example, the one or more options may include choosing a sport and begin selection of a fantasy sports team, viewing tickets or other wager indicia for wagers previously placed via personalized wager application 130, and/or one or more other options. In various implementations, the menu may comprise selectable components. For example, the menu may include selectable component 302 and selectable component 303. When selected, selectable component 304 may cause one or more interfaces to be displayed through which a user may choose a sport and begin selection of a fantasy sports team. When selected, selectable component 303 may cause one or more interfaces to be displayed through which a user may view wager tickets or wager indicia for wagers previously placed via personalized wager application 130. In some implementations, the menu may include one or more other selectable components which, when selected, enable access to raw athlete or team statistics, a player's account profile (e.g. avatar, financial information, success statistics), the player's friends' fantasy sports teams or account profiles, game times and real time sports information, and/or other information.

Figure 4:
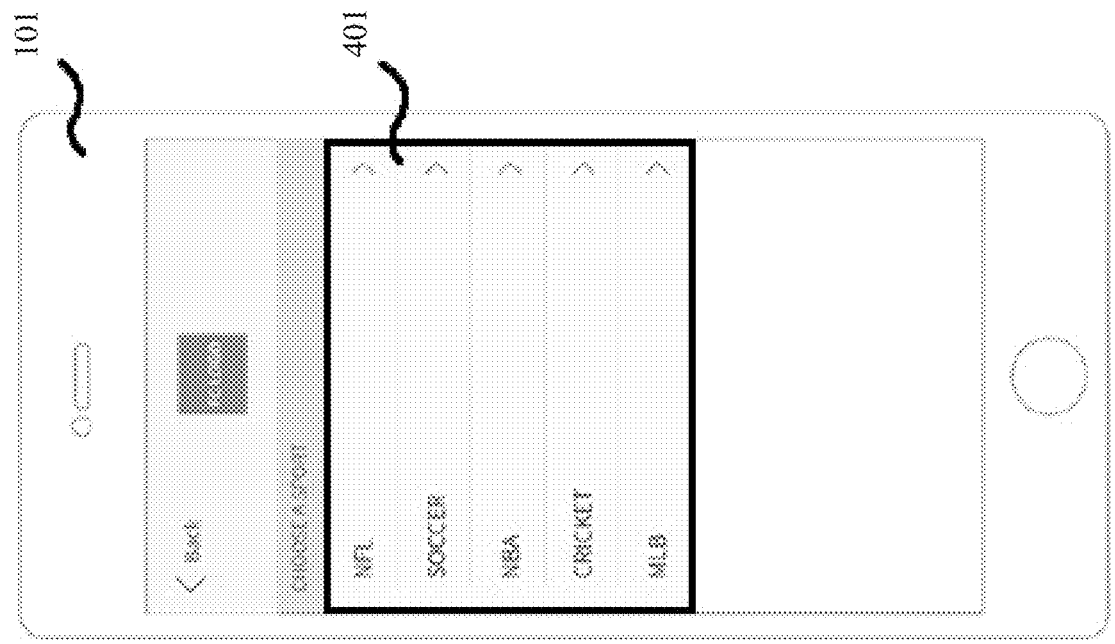

FIG. 4 depicts an example of a user interface of a gaming machine configured to enable a player to select a sport from which to select athletes for a fantasy sports team, according to an implementation of the invention. In various implementations, a user interface 401 displayed on a display of gaming machine 110 may include a sport selection menu that enables a user to select one or more sports and/or leagues from which to build the player's fantasy sports team (upon which one or more wagers may be placed). For example, the one or more sports and/or leagues may include NFL, SOCCER, NBA, CRICKET, MLB, NHL, eSports, and/or one or more other sports. In some implementations, the sports from which individual athletes may be selected may comprise team-based or non-team-based sports. In some implementations, selection of selectable component 304 may cause the user interface comprising the sport selection menu to be displayed.

Figure 5:
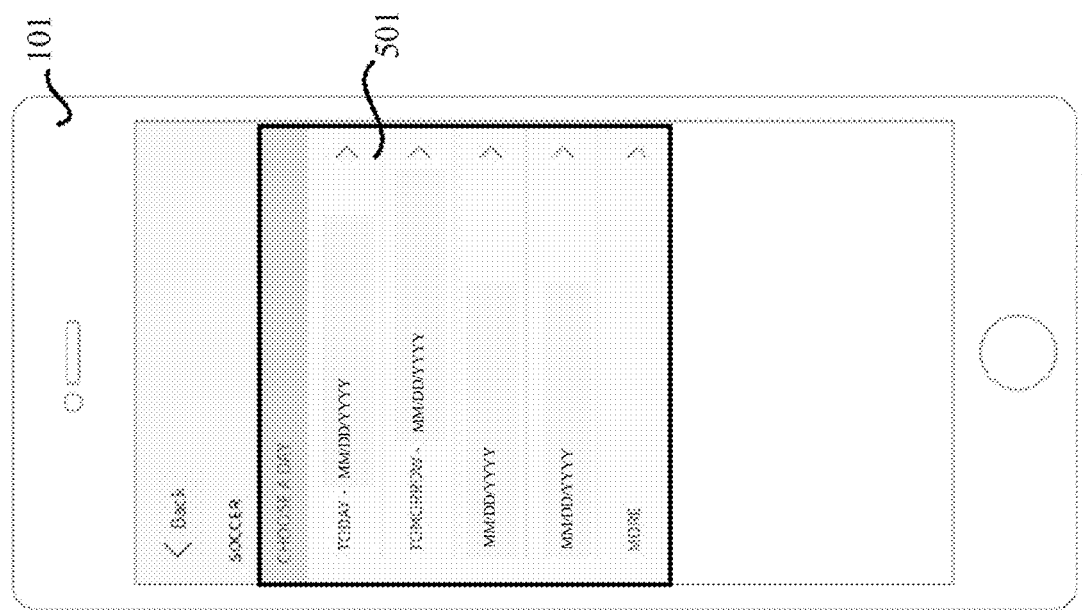
Figure 8C:
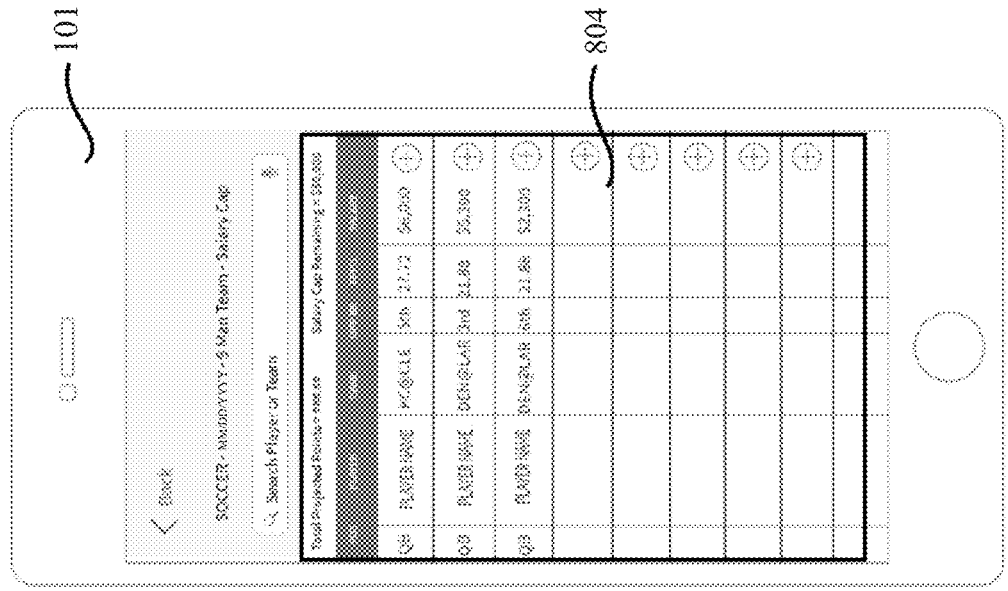
Figure 8B:
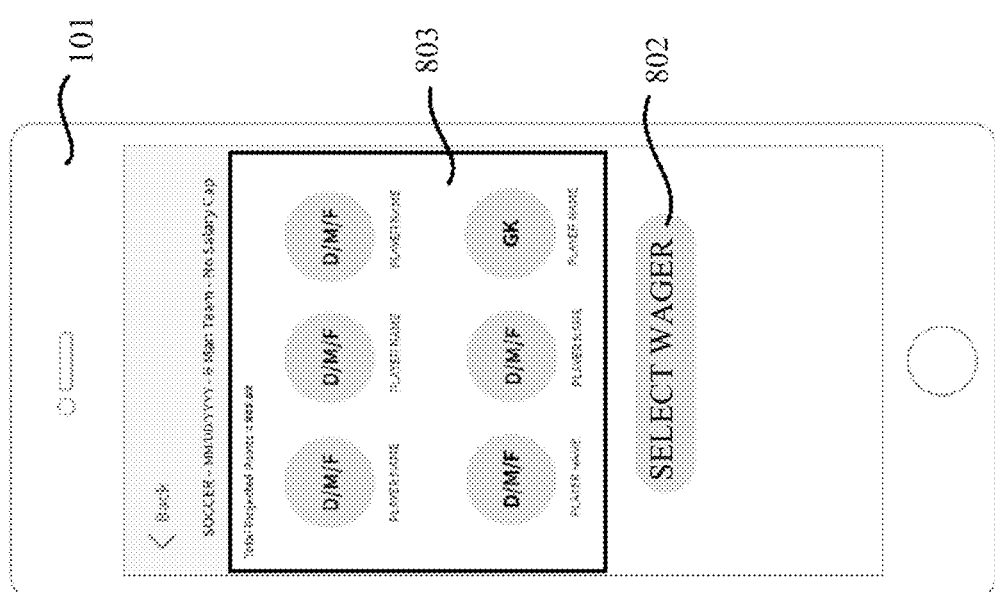

FIG. 5 depicts an example of a user interface of a gaming machine configured to enable a player to select the date or date range associated with a fantasy sports team, according to an implementation of the invention. In various implementations, a user interface 501 displayed on a display of gaming machine 110 may include a date selection menu that enables a user to select a time period during or on which a fantasy sports team will be evaluated. In some implementations, a date selection menu may be provided via a display of gaming machine 110 after the selection of a fantasy sports team. In some implementations, a calendar widget may appear upon selection of one or more selectable components of date selection menu to enable a user to select a date range on a calendar. As such, a user may be able to customize a time period in which a user-built fantasy sports team will be evaluated.

Figure 6:
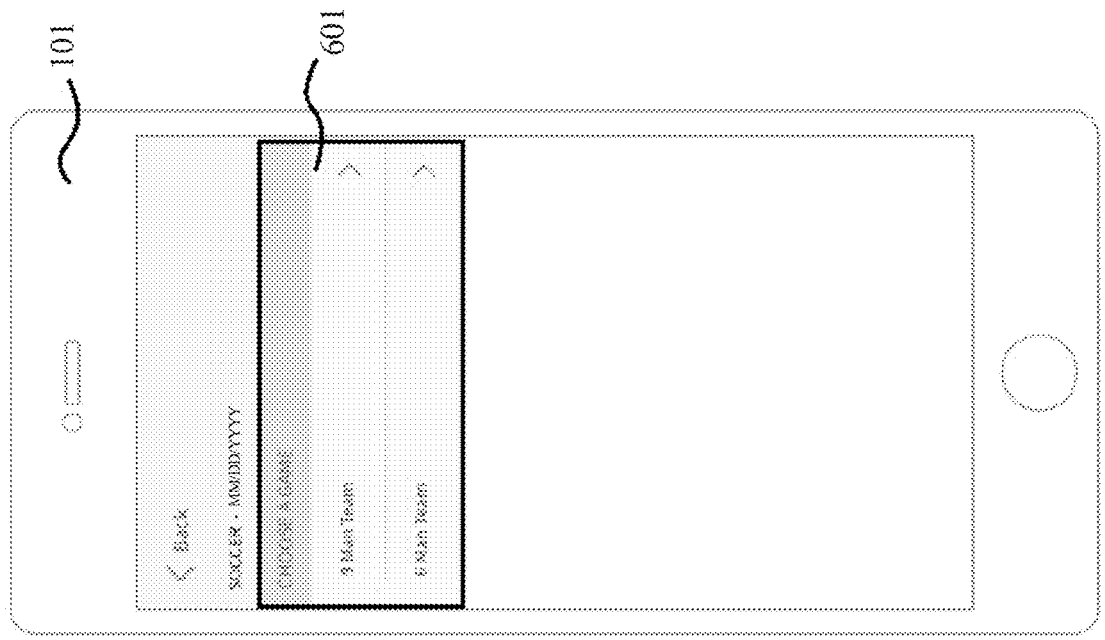

FIG. 6 and FIG. 7 depict examples of user interfaces of a gaming machine configured to enable a player to select other fantasy sports parameters, according to an implementation of the invention. In various implementations, various parameters may be available for individual sports. For example, certain parameters may be available for one sport that are not available for another sport. In an example implementation, a user interface 601 displayed on a display of gaming machine 110 may include a parameter selection menu that enables a user to select one or more parameters unique to a sport selected, and from which a user has selected to build a fantasy sports team. For example, the user may have selected the sport SOCCER and user interface 601 may present the user with the option to select a 9-man team, a 6-man team, and/or other configuration of players. In an example implementation, a user interface 701 displayed on a display of gaming machine 110 may include a parameter selection menu that enables a user to select one or more parameters unique to a contest selected, and for which a user has selected to build a fantasy sports team. For example, the user may have selected a given contest (or sport) and user interface 701 may present the user with the option to select from either having a salary cap or not having a salary cap. A salary cap may limit the individual athletes from which a user may built a fantasy sports team. For example, each athlete may have an assigned value. In a contest having a salary cap, a user may be prevented from building a fantasy sports team that has a combined value (i.e., the sum value of the individual athletes making up the fantasy sports team) greater than the salary cap. In some implementations, a given sport or contest may have default parameters (e.g., a default team configuration or default salary cap setting), in which case a user may not be presented with a user interface from which to select from multiple parameters.

FIG. 8A-8D depict examples of user interfaces of a gaming machine configured to enable a player to select athletes for a roster, according to an implementation of the invention. In an example implementation, a user interface 801 displayed on a display of gaming machine 110 may depict a set of positions for which a user must select at least one athlete for each position. For example, user interface 801 depicts a roster for a 9-man NFL football-based fantasy sports team with a salary cap. The athlete information for selected and yet-to-be-selected athletes may be displayed on user interface 801. In some implementations, selection of an open slot on the fantasy team will populate athlete options for placement in the open slot in a separate screen. In some implementations, selection of any position or slot on the fantasy team will populate athlete options for placement or replacement in the slot. In some sports or game styles, no positions will be indicated, only a number, or blank circle, or other placeholder graphic. In some implementations, the "player name" may instead be replaced with vehicle numbers, animal names, and whole teams (e.g., for a march madness team selection) as game elements of the fantasy team. Below each "player name," the cost of retaining that athlete on the fantasy team may be depicted. In some implementations, the projected points for a partially-selected fantasy sports team and the remaining salary cap that will limit the player in selection of the final two athletes to complete the 9-man fantasy team may be displayed. In some implementations, a user may elect to have a fantasy sports team for a fantasy sports contest auto-populated by system 100 based one or more contest parameters for the fantasy sports contest. For example, in some implementations, a user may select a portion of the athletes required to fill a fantasy sports team and provide user input indicating a request to auto-populate the remaining spots to be filled on the fantasy sports team. In the foregoing example implementation, system 100 may be configured to identify one or more athletes to fill in the remaining spots on the fantasy sports team based on the positions left to be filled, the remaining salary cap available, the projected point total for the available athletes to be selected, a particular team that includes available athletes to be selected for the fantasy sports team, and/or other factors. In some implementations, user interface 801 may include a selectable components that, when selected, causes a fantasy sports team to be auto-populated for the user based on one or more teams that include available athletes to be selected for the fantasy sports team (e.g., a selectable component that enables a user to "Bet the Team"). For example, a user may provide user input identifying a team (e.g., the New England Patriots) and a request to have a fantasy sports team auto-populated to include athletes from the New England Patriots subject to roster requirements and the salary cap available. In some implementations, a selectable option 802 may be displayed, in connection with user interface 801, that enables a user to select from one or more wager opportunities based on the fantasy sports team selected, an identified time period, and/or other parameters. In some implementations, selectable option 802 may only become active once a full team has been selected, or at least a predefined number of athletes required in order to be presented with one or more wager opportunities is selected. In another example implementation, a user interface 803 displayed on a display of gaming machine 110 may depict a roster for a 6-person team for a soccer-based fantasy sports team. In this example implementation, the user may be required to select at least one goalkeeper and 5 other players that are any other position besides goalkeeper.

In an example implementation, a user interface displayed on a display of gaming machine 110 may depict an athlete menu 804 comprising additional detail on the athlete options available, the projected point total for athletes selected, the remaining salary cap available, and/or other information. In some implementations, for each athlete choice available for the particular position (e.g., football quarterback), the game that that athlete will play in during the identified wager period, the athlete's position, rank, assigned value (or salary), average points per game (PPG), and/or other information may be displayed to facilitate the user's selection. It should be appreciated that other information for the selection may also be presented based on the game style, sport, or position being selected, for example. Each athlete may be chosen by selection or pressing of the plus-sign icon depicted by each athlete. This selection may return the player to the roster screen of user interface 801 with the selected quarterback (QB) from this screen filling the QB position shown. In some implementations, a user may search for athletes or teams within the listed choices. This search functionality may be provided on whatever screen that is presented to the player for selection of athletes for the fantasy team roster. In some implementations, a search bar may be included on any of the roster screens of FIGS. 8A-8D and enable the player to search and select players directly from the search function. In some implementations, the athlete menu 804 of FIG. 8C may not be presented and may be used only if the player elects to see more detail on an athlete before selection. For example, the player may wish to compare all athletes for a position by how that athlete will affect the projected score generated by the game, allowing the player to compare the projections with the PPG or with third party projections for the athlete.

In some implementations, a user interface 805 displayed on a display of gaming machine 110 may depict fantasy sports team roster comprising a fully selected roster. Based on the selection of a full roster, the player may be able to view one or more wager opportunities based on the selected fantasy sports team by selecting selectable option 802. In some implementations, selection of the selectable option 802 may cause personalized wager application 130 to generate one or more wager opportunities based on the projected team score for the selected fantasy sports team, as described herein.

Figure 9A:
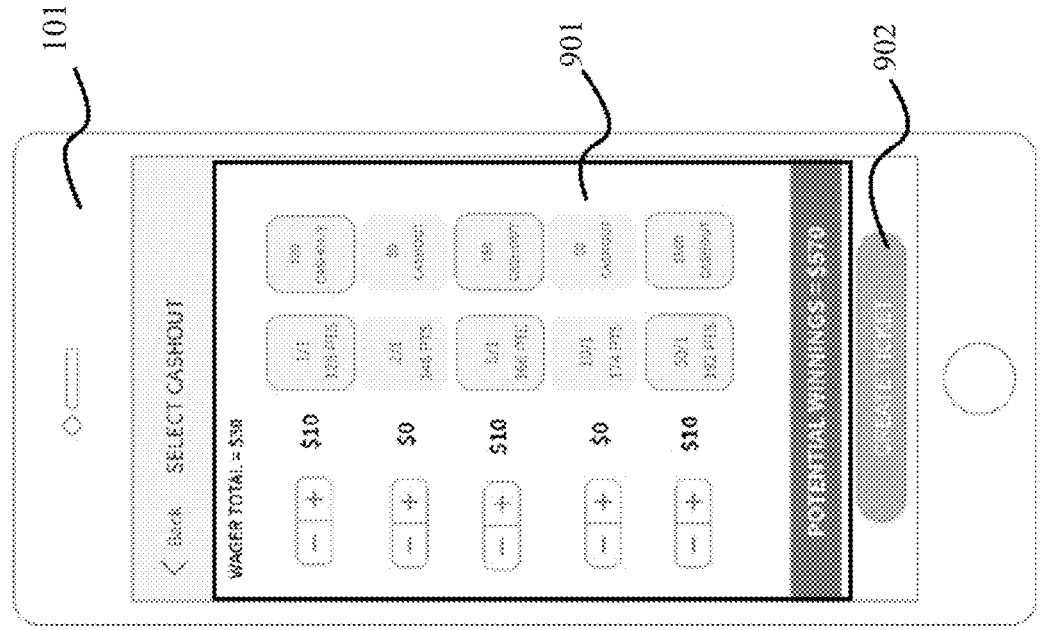
Figure 8D:
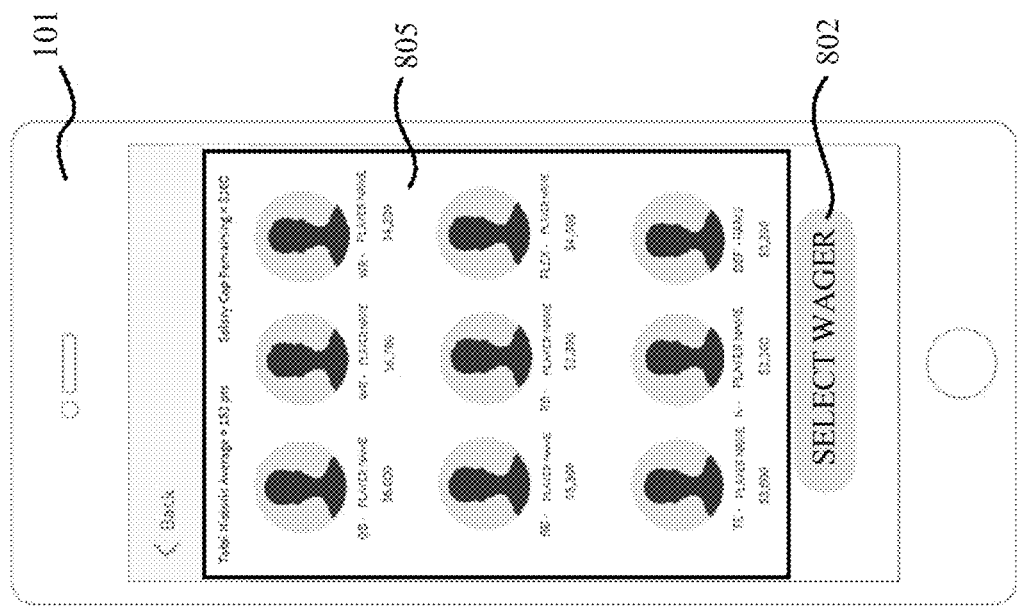

FIG. 9A-9B depict examples of user interfaces of a gaming machine configured to enable a player to wager on a selected fantasy sports team, according to an implementation of the invention. In various implementations, a user interface 901 displayed on a display of gaming machine 110 may depict a set of selectable wager opportunities based on a fantasy sports team selected by the user. For example, the wager opportunities may comprise wager opportunities generated by personalized wagering application 130 as described herein. In some implementations, the generated wager opportunities may be based on a projected team score for a selected fantasy sports team. For example, if the projected team score of a fantasy sports team selected by a user is 98 points, the system may generate a number of wager opportunities that each include a benchmark point level and associated odds for that benchmark point level. In some implementations, the projected team score for a fantasy sports team may comprise a benchmark point level for a wager opportunity presented based on that fantasy sports team. By way of example only, one or more wager opportunities may be generated based on a projected team score of 98 points and presented to a user as follows:

| Point Level | Odds |
| --- | --- |
| 128 | 1/1 |
| 146 | 2/1 |
| 166 | 5/1 |
| 174 | 10/1 |
| 192 | 50/1 |

As illustrated above, for the projected team score of 98 points, wager opportunities may be generated and presented with benchmark point levels above and/or below the projected team score. In some implementations, the projected team score for a fantasy sports team may itself comprise a benchmark point level for a wager opportunity presented based on that fantasy sports team. In some implementations, the benchmark point levels of the wagers in the table above may be calculated by the wager opportunity component 204 to correspond with commonly wagered risk ratios or odds (e.g., 2/1, 5/1, 10/1), but may be calculated for any level of risk. In some implementations, wager opportunities may be presented with a default list of risk ratios and/or player customized risk ratios.

As depicted in FIG. 9A, the wager opportunities presented may include wager opportunities with increasingly higher payouts associated with increasingly higher benchmark point levels to be achieved by the selected fantasy team. In some implementations, user interface 901 displayed on a display of gaming machine 110 may include selectable components to enable a user to select a wager opportunity, an amount to wager on that wager opportunity, a potential payout based on the selected amount, and/or other information associated with one or more wager opportunities. In some implementations, user interface 901 displayed on a display of gaming machine 110 may display an indication of the total potential payout by aggregating the potential payouts for the player selected wagers for the current selected fantasy team. In some implementations, user interface 901 displayed on a display of gaming machine 110 may include a selectable component 902 that, when selected, causes a wager to be placed and a ticket or other wager indicia to be provided.

FIG. 9B depicts an example of a user interface of a gaming machine configured to enable a player to place wagers based on wager opportunities for a selected fantasy sports team, according to an implementation of the invention. In some implementations, wager menu 903 and wager menu 904 displayed on a display of gaming machine 110 may include alternative wager opportunities. In an example implementation, wager menu 903 may display wager opportunities based on multiple benchmark point levels (or a combination of wager opportunities). In other words, wager menu 903 may enable a user to place a parlay wager based on multiple wager opportunities. For example, by placing a parlay wager based on multiple benchmark point levels, a user may place one bet and have multiple chances (e.g., five chances to win based on five separate benchmark point levels). In other words, if any of the benchmark point levels are met, the user may receive a payout (or a portion of a payout) determined at the time the wager was placed. In an example implementation, wager menu 904 may display larger risk wagers with increased odds.

FIG. 10 depicts an example of a user interface of a gaming machine configured to display to a player the results of a wager on a selected fantasy sports team, according to an implementation of the invention. For example, the user interface of FIG. 10 may include a display component 1001 displaying information associated with a given wager (or set of wagers), a display component 1002 displaying potential payouts wagered, a display component 1003 displaying individual scores for athletes on a fantasy sports team upon which a wager is based, and selectable component 1004 that, when selected, may facilitate the cash out of payouts awarded or available funds in an account of a user. In some implementations, a unique code for a wager may be displayed for one or more wagers viewed via a user interface of a gaming machine.

In some implementations, system 100 may be configured to provide alerts based on a fantasy sports team, or individual athletes on a fantasy sports team, hitting predetermined performance benchmarks. For example, system 100 may be configured to provide an alert to the user when a fantasy sports team hits a benchmark point level associated with a wager placed based on one or more wager opportunities and/or when an individual athlete on the fantasy sports team reaches a projected score for that particular athlete. In some implementations, the alerts may comprise text alerts, auditory alerts, and/or other types of alerts. In an example implementation, when an athlete hits a performance benchmark for that athlete, a bronze, silver, or gold ring may be displayed on an interface of system 100 to indicate that the athlete hit one or more of his or her performance benchmarks.

Figure 11:
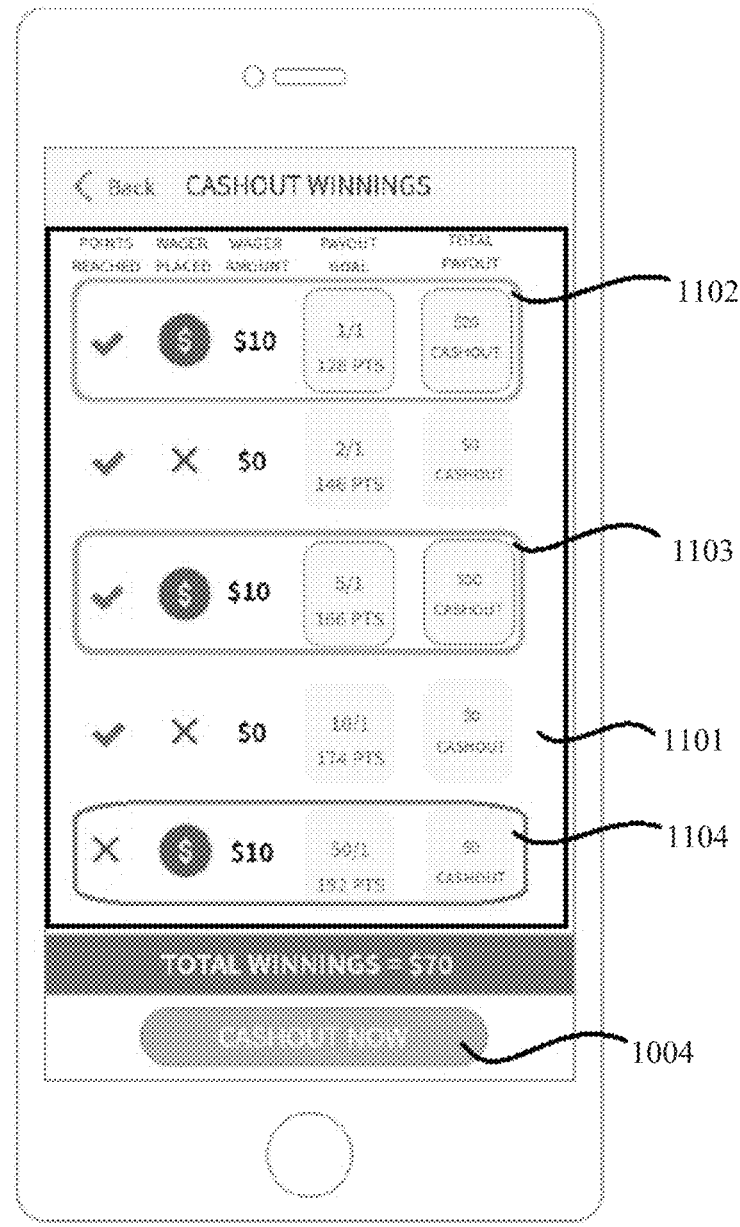

FIG. 11 depicts an example of a user interface of a gaming machine configured to enable a player to cash out winnings based on a fantasy sports wager, according to an implementation of the invention. For example, a user interface 1101 of FIG. 11 may include a display component 1102, a display component 1103, a display component 1104, and/or other display components that each indicate a wager placed and an outcome of the placed wager. In some implementations, additional information associated with each wager may be included. For example, each display component for a wager may include an indication of a wager amount, whether the benchmark point level was reached, a potential payout if the benchmark point level was reached, the total payout for each wager, and/or other information associated with the wager. In some implementations, each display component for a wager (e.g., display components 1102, 1103, and 1104) may comprise a selectable component that, when selected, enables a user to cash out the payout awarded for that wager.

Example Flowchart of Processes

Figure 12:
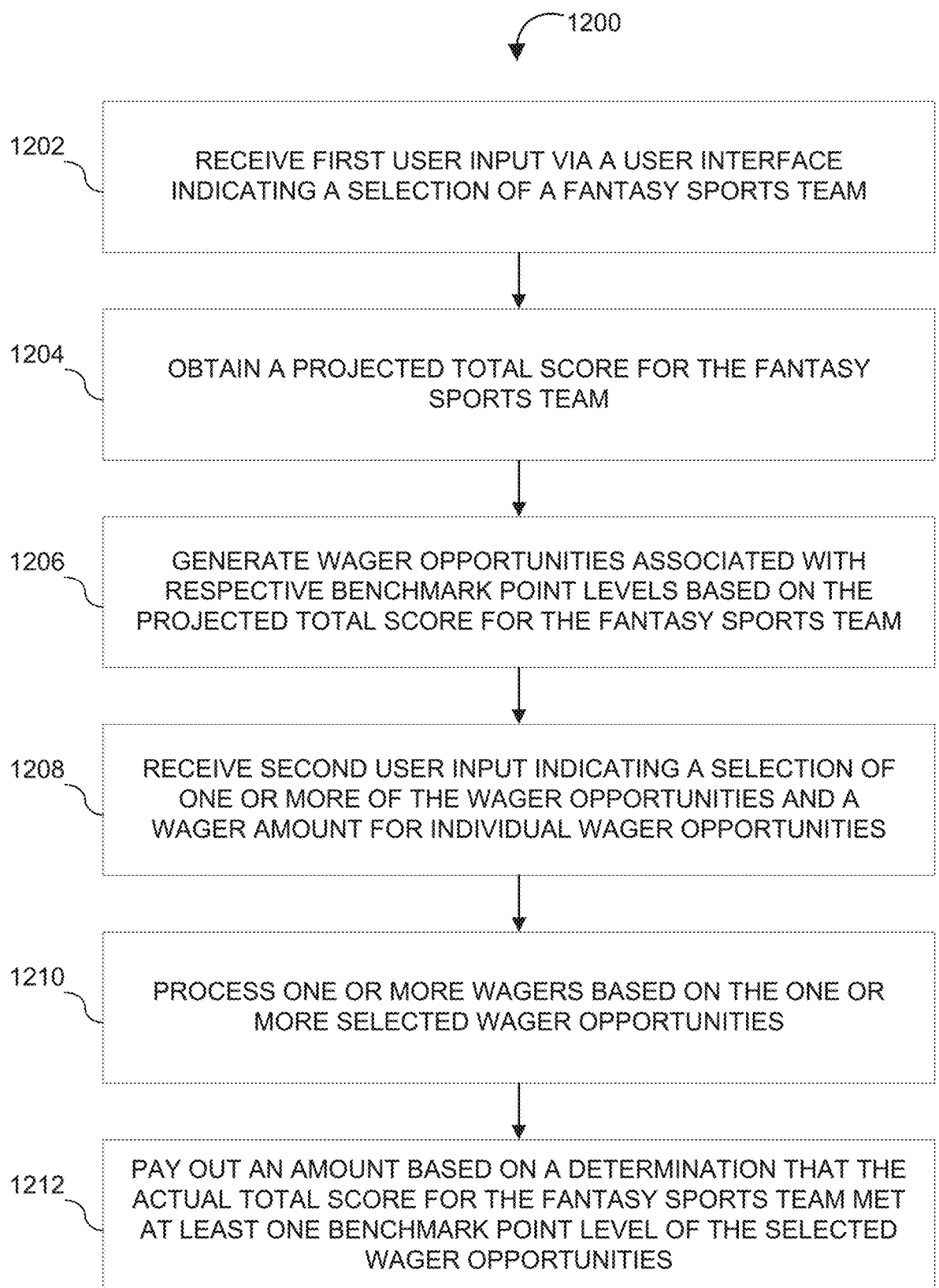
FIG. 12 illustrates an example of a process of facilitating personalized wager opportunities based on a user-selected fantasy sports team, according to an implementation of the invention.

FIG. 12 illustrates an example of a process 1200 of facilitating personalized wager opportunities based on a user-selected fantasy sports team, according to an implementation of the invention. The operations of process 1200 presented below are intended to be illustrative and, as such, should not be viewed as limiting. In some implementations, process 1200 may be accomplished with one or more additional operations not described, and/or without one or more of the operations discussed. In some implementations, two or more of the operations may occur substantially simultaneously. The described operations may be accomplished using some or all of the system components described in detail above.

In some implementations, process 1200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). For example, process 1200 may be implemented by a gaming machine (e.g., gaming machine 101) as described herein. The one or more processing devices may include one or more devices executing some or all of the operations of process 1200 in response to instructions stored electronically on one or more electronic storage mediums. The one or more processing devices may include one or more devices configured through hardware, firmware, and/or software to be specifically designed for execution of one or more of the operations of process 1200.

In an operation 1202, process 1200 may include receiving first user input via a user interface indicating a selection of a fantasy sports team. For example, the first user input may be received via a graphical user interface of a gaming machine. In some implementations, operation 1202 may include generating a graphical user interface configured to receive the first user input. The fantasy sports team may comprise a set of athletes. As such, the first user input indicating a selection of a fantasy sports team may comprise a selection of a set of athletes. In some implementations, operation 1202 may be performed by one or more processor components the same as or similar to fantasy game application 120 (shown in FIG. 1 and described herein) and/or interface generation component 212 (shown in FIG. 2 and described herein).

In an operation 1204, process 1200 may include obtaining a projected team score for the selected fantasy sports team. A projected team score may be based at least in part on past performance of the individual athletes selected. In some implementations, a projected team score may be obtained from a third party source. In some implementations, a projected team score may be generated based at least in part on the past performance of the individual athletes of the set of athletes selected. In some implementations, a projected team score may be based on wagers placed by other user. In some implementations, operation 1204 may be performed by one or more processor components the same as or similar to fantasy game application 120 (shown in FIG. 1 and described herein).

In an operation 1206, process 1200 may include generating one or more wager opportunities based on the projected team score for the fantasy sports team. In various implementations, the one or more wager opportunities may comprise one or multiple wager opportunities. For example, the one or more wager opportunities may comprise a set of wager opportunities. Each wager opportunity may be associated with a benchmark point level and a payout. In various implementations, the payout for a wager opportunity may be based on the relation between the respective benchmark point level for that wager opportunity and the projected team score. A set of wager opportunities generated for a fantasy sports team may include benchmark point levels above, at, and/or below the projected team score for the fantasy sports team. In various implementations, generating a set of wager opportunities may include determining odds for individual wager opportunities based on the relationship between the respective benchmark point level and the projected team score. The payout for a given wager opportunity may be based on the odds for that individual wager opportunity and the amount of the wager. In some implementations, operation 1206 may be performed by one or more processor components the same as or similar to wager opportunity component 204 (shown in FIG. 2 and described herein).

In an operation 1208, process 1200 may include receiving a second user input indicating a selection of one or more of the wager opportunities and a wager amount for individual wager opportunities of selected wager opportunities. In some implementations, multiple wager opportunities may be selected. For example, a user may indicate an amount to be wagered on multiple wager opportunities (i.e., multiple benchmark point levels). In some implementations, a user may select multiple wager opportunities and wager a different amount on each of the different wager opportunities. In some implementations, operation 1208 may be performed by one or more processor components the same as or similar to wager record component 206 (shown in FIG. 2 and described herein).

In an operation 1210, process 1200 may include processing one or more wagers based on the one or more selected wager opportunities. In various implementations, an indication of the one or more wagers placed may be provided via a graphical user interface. For example, the indication of the one or more wagers placed may include an indication of a potential payout based on an actual total score for the fantasy sports team. In some implementations, each wager placed based on one or more selected wager opportunities may be stored as a hash of the fantasy sports team and the respective odds for the one or more selected wager opportunities. In some implementations, operation 1210 may be performed by one or more processor components the same as or similar to wager record component 206 (shown in FIG. 2 and described herein).

In an operation 1212, process 1200 may include paying out an amount to a player based on the determination that the actual total score for the fantasy sports team met the benchmark point level for the at least one of the one or more selected wager opportunities (for which a wager was placed). For example, upon completion of one or more underlying sports events associated with the fantasy sports team, the actual total score for the fantasy sports team and whether the actual total score for the fantasy sports team met a benchmark point level for at least one of the one or more selected wager opportunities may be determined. In various implementations, the actual total score for the fantasy sports team may be based on one or more underlying sporting events. For example, when a fantasy sports team is selected, a set of parameters associated with the fantasy sports contest may be obtained. The set of parameters may indicate the underlying sporting events associated with the fantasy sports contest. For example, the underlying sporting events may include a set of sporting events occurring within a defined time period. Both the projected team score and the actual team score may be determined based on the underlying sporting events. Based on the determination that the actual total score for the fantasy sports team has met at least one benchmark point level associated with a wager, an amount of the pay out may be transferred to an account of the user. In some implementations, operation 1212 may be performed by one or more processor components the same as or similar to outcome determination component 208 and/or wager settlement component 210 (shown in FIG. 2 and described herein).

Figure 13:
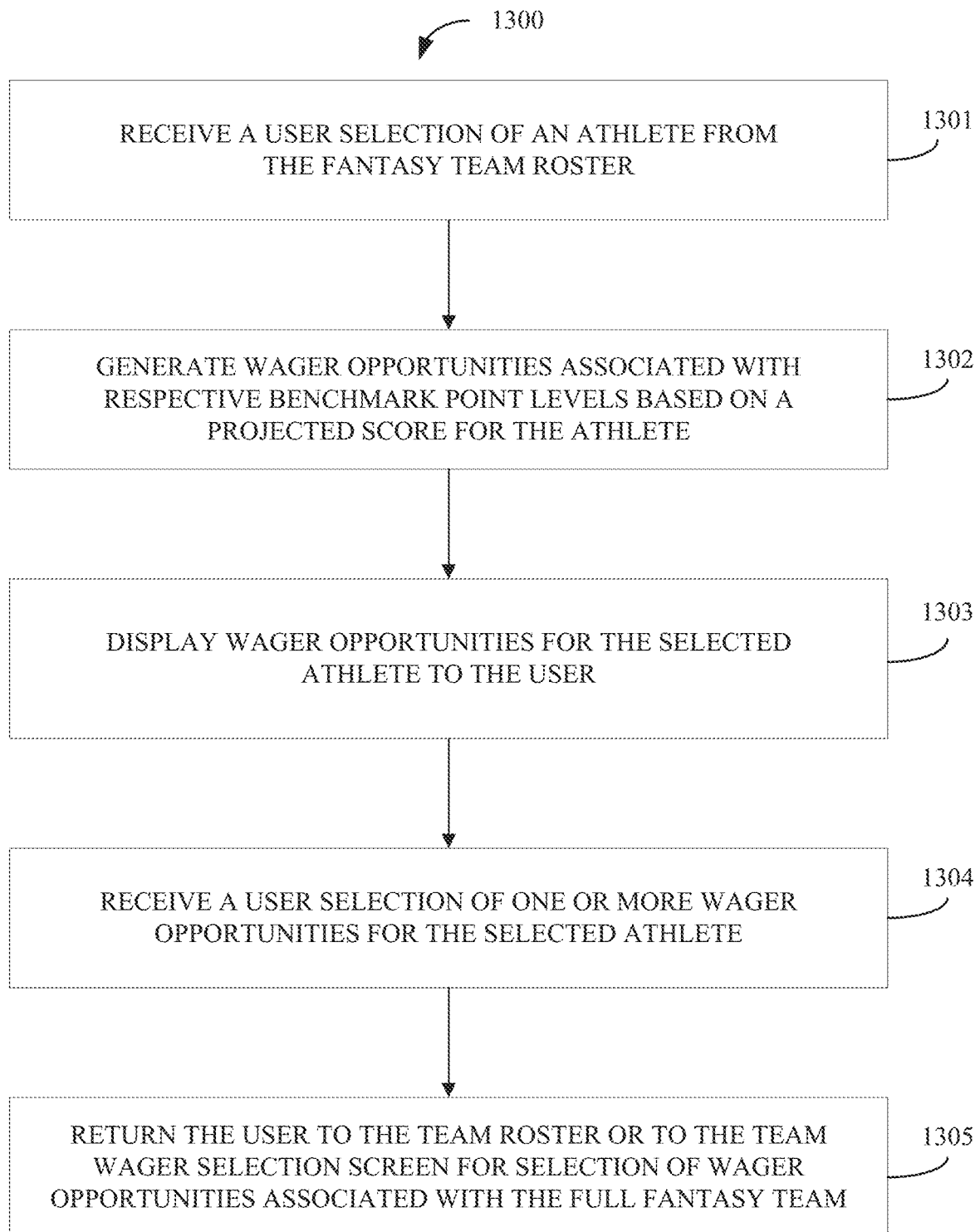
FIG. 13 illustrates an example of a process of facilitating personalized wager opportunities based on the performance of individual athletes on a user's fantasy team, according to an implementation of the invention.

FIG. 13 illustrates an example of a process 1300 of facilitating personalized wager opportunities for athletes of a user-selected fantasy sports team, according to an implementation of the invention. The operations of process 1300 presented below are intended to be illustrative and, as such, should not be viewed as limiting. In some implementations, process 1300 may be accomplished with one or more additional operations not described, and/or without one or more of the operations discussed. In some implementations, two or more of the operations may occur substantially simultaneously. The described operations may be accomplished using some or all of the system components described in detail above.

In an operation 1301, the process 1300 receives a user selection of an athlete from the fantasy team roster. As noted previously, selection of an athlete on the fantasy roster may display additional information including statistics and possible replacements or alternatives. In operation 1301, this selection is received to process 1300 and utilized to provide the player with individual athlete wagers. This selection may be made either from one of the roster screens shown in FIG. 8A, 8B, or 8D or from the player or position detail screen of FIG. 8C. Alternatively, the wager placement screens 9A and 9B may provide areas for selection of an athlete from the fantasy team roster for individual wagers. For some sporting events, such as horse racing or tennis, wagers on individual athletes or animals and their specific performance are more important than in other sports.

In an operation 1302, the process 1300 generates wager opportunities associated with the respective benchmark point levels of the athlete based on a projected score for the athlete. The projected score may be the points contributed to the fantasy team score by the athlete or may be other contributions by the athlete such as blocks, tackles, interceptions, rebounds, errors, runs, minutes played, or stolen bases. As a result, the player's wagers or expectations with respect to an individual athlete may be unrelated to or not included in the projected score of the fantasy team (e.g. defensive contributions).

In an operation 1303, the process 1300 displays wager opportunities for the selected athlete to the user. The display may be in the form of an additional screen or dropdown menu. The drop-down menu for Tom Brady may, for example, show the following wagers: 1:1=beat 24.7 pts; 2:1=beat 28.35 pts; 5:1=beat 31.25 pts; 10:1=beat 35.78 pts; 50:1=beat 41.09 pts. This display of wager opportunities may be provided alongside or together with the player statistics.

In an operation 1304, the process 1300 receives a user selection of one or more of the wager opportunities displayed to the user for the selected athlete. In some implementations, multiple wager opportunities may be selected. For example, a user may indicate an amount to be wagered on multiple wager opportunities (i.e., multiple benchmark point levels). In some implementations, a user may select multiple wager opportunities and wager a different amount on each of the different wager opportunities.

In an operation 1305, the process 1300 returns the user to the team roster (e.g. FIG. 8A, 8B, or 8D) for additional use operations and selections or the process 1300 returns the user to the wager selection screen for the full fantasy team (e.g. FIG. 9A or 9B) which shows the full team point benchmark levels. The player may then continue selecting the rest of the fantasy team or may continue selecting wagers for the full fantasy team. The selection in operation 1304 or the return to the team wager selection screen may generate the wager indicia and finalize the wager on the individual player. Alternatively, the player's selection of the wager for the individual athlete is left open and not finalized until the team wager is placed. The player is then provided is one or more wager indicia showing the team wagers and/or the individual athlete wagers.

The various processing operations and/or data flows depicted in FIG. 12 and FIG. 13 (and in the other drawing figures) are described in greater detail herein. The processes of FIG. 13 may be sub-processes of the process 1200 of FIG. 12. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

For purposes of explanation, numerous specific details are set forth in order to provide a thorough understanding of the description. It will be appreciated by those having skill in the art that the implementations described herein may be practiced without these specific details or with an equivalent arrangement. Accordingly, it is to be understood that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The various instructions described herein are exemplary only. Other configurations and numbers of instructions may be used, so long as the processor(s) are programmed to perform the functions described herein. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions.

The various instructions described herein may be stored in a storage device, which may comprise random access memory (RAM), read only memory (ROM), and/or other memory. For example, one or more storage devices 104 may comprise any tangible computer readable storage medium, including random access memory, read only memory, magnetic disk storage media, optical storage media, flash memory devices, and/or other memory configured to computer-program instructions. In various implementations, one or more storage device 104 may be configured to store the computer program instructions (e.g., the aforementioned instructions) to be executed by the processors as well as data that may be manipulated by the processors. The storage device may comprise floppy disks, hard disks, optical disks, tapes, or other storage media for storing computer-executable instructions and/or data.

One or more databases may be stored in one or more storage devices 104. The databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

In some instances, well-known structures and devices are shown in block diagram form in order to avoid unnecessarily obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer system configured to facilitate personalized wager opportunities based on a user-selected fantasy sports team, computer system comprising:
    one or more physical processors; and
    a storage device configured to store one or more computer program instructions that, when executed by the one or more physical processors, configure the computer system to:
        generate a graphical user interface;
        receive, via the graphical user interface, identification of a first user;
        obtain, responsive to the identification of the first user, first user account data for the first user;
        generate, for display via the graphical user interface, an interactive contest parameters selector allowing the first user to select contest parameters defining rules of a first contest including rules governing pre-defined roster requirements of fantasy sports teams in the first contest;
        receive, via the graphical user interface, first user input comprising a selection by the first user of first contest parameters from the interactive contest parameters selector;
        generate, for display via the graphical user interface and based on the selected first contest parameters, an interactive list of one or more individual athletes available for selection by the first user to associate with a first fantasy sports team of the fantasy sports teams in the first contest;
        receive, via the graphical user interface, second user input comprising a selection of one or more individual athletes from the interactive list of one or more individual athletes to associate with the first fantasy sports team;
        generate, for display via the graphical user interface, an interactive time period selector for selection of a time period by the first user;
        receive, via the graphical user interface, third user input comprising selection of a first time period from the interactive time period selector;
        obtain, in response to receipt of the first, second, and third user inputs, a projected team score for the first fantasy sports team, wherein the projected team score is based on one or more sports events in which the one or more individual athletes associated with the first fantasy sports team participate during the first time period;
        generate, in response to receipt of the first, second, and third user inputs, a set of wager opportunities for the first user based on the projected team score for the first fantasy sports team, the set of wager opportunities comprising at least a first wager opportunity and a second wager opportunity, wherein the first wager opportunity includes a first benchmark point level and first odds determined based on a first relation between the first benchmark point level and the projected team score, and wherein the second wager opportunity includes a second benchmark point level different from the first benchmark point level and second odds determined based on a second relation between the second benchmark point level and the projected team score;
        generate, for display via the graphical user interface, an interactive listing of the set of wager opportunities comprising, for the first wager opportunity, the first benchmark point level, the first odds, a user-adjustable first wager amount, and a first potential payout amount calculated based on a value of the user-adjustable first wager amount and the first odds, and, for the second wager opportunity, the second benchmark point level, the second odds, a user-adjustable second wager amount, and a second potential payout amount calculated based on a value of the user-adjustable second wager amount and the second odds, wherein the first and/or second potential payout amount is provided based on whether the first and/or second benchmark point level is met by an actual total score for the first fantasy sports team, the actual total score based on the one or more sports events in which the one or more individual athletes associated with the first fantasy sports team participate during the first time period;
        display, via the graphical user interface, a simultaneous display of the interactive listing for the first and second wager opportunities of the set of wager opportunities, including separate user-adjustable wager amounts for both the first and second wager opportunities;
        receive, via the graphical user interface, a fourth user input comprising at least one of a first wager comprising a selection of the first wager opportunity of the set of wager opportunities, including the value of the user-adjustable first wager amount and a second wager comprising a selection of the second wager opportunity of the set of wager opportunities, including the value of the user-adjustable second wager amount;
        process the received first and/or second wager based on the first or second wager opportunities;
        store each of the first and/or second wagers based on the first and/or second selected wager opportunities as a hash of the first fantasy sports team and the respective odds for the first and/or second selected wager opportunities;
        provide, via the graphical user interface, an indication of the first and/or second wagers placed, the indication of the first and/or second wagers placed including the first and/or second potential payout amount;
        determine, upon completion of the one or more sports events in which the one or more athletes associated with the first fantasy sports team participate during the first time period, that the actual total score for the first fantasy sports team has met the first benchmark point level for the first wager opportunity and/or the second benchmark point level for the second wager opportunity;
        provide, via the graphical user interface, an indication that the first user has won the first potential payout based on the determination that the actual total score for the first fantasy sports team has met the first benchmark point level for the first wager opportunity and/or an indication that the first user has won the second potential payout based on the determination that the actual total score for the first fantasy sports team has met the second benchmark point level for the second wager opportunity; and provide the first and/or second payout to the first user in accordance with the first user account data.

2. The computer system of claim 1, wherein to obtain the projected team score for the first fantasy sports team, the computer system is configured to:

obtain the projected team score from a third party source.

3. The computer system of claim 1, wherein to obtain the projected team score for the first fantasy sports team, the computer system is configured to:

generate the projected team score based at least in part on past performance of the one or more individual athletes associated with the first fantasy sports team.

4. The computer system of claim 1, wherein the projected team score is based on wagers placed by at least one other user.

5. The computer system of claim 1, wherein the respective first and second benchmark point levels of the set of wager opportunities include benchmark point levels above, at, and/or below the projected team score.

6. The computer system of claim 1, wherein:

the first contest parameters comprise parameters defining the one or more individual athletes eligible for association with the first fantasy sports team by the first user and user-defined scoring rules for the first contest;

the interactive list of one or more individual athletes available for selection by the first user includes only athletes eligible for selection based on the first contest parameters; and the set of wager opportunities is determined based on the user-defined scoring rules for the first contest.

7. The computer system of claim 1, wherein:

the interactive contest parameters selector displays at least one parameter that is unique to a type of sport associated with the first fantasy sports team; and the interactive list of one or more individual athletes available for selection comprises a plurality of selectable indicia capable of being populated with identifying information of the one or more individual athletes, one or more of the selectable indicia having predefined associations with corresponding roles of one or more of athletes on the first fantasy sports team.

8. The computer system of claim 1, wherein the first contest parameters comprises a number of individual athletes that may be associated with the first fantasy sports team.

9. A computer-implemented method for facilitating personalized wager opportunities based on a user-selected fantasy sports team, the method being implemented on a computer system having one or more physical processors programmed with computer program instructions which, when executed, perform the method, the method comprising:

generating, by the computer system, a graphical user interface;

receiving, by the computer system via the graphical user interface, identification of a first user;

obtaining, by the computer system and responsive to the identification of the first user, first user account data for the first user;

generating, by the computer system for display via the graphical user interface, an interactive contest parameters selector allowing the first user to select contest parameters defining rules of a first contest including rules governing predefined roster requirements of fantasy sports teams in the first contest;

receiving, by the computer system via the graphical user interface, first user input comprising a selection by the first user of first contest parameters from the interactive contest parameters selector;

generating, by the computer system for display via the graphical user interface and based on the selected first contest parameters, an interactive list of one or more individual athletes available for selection by the first user to associate with a first fantasy sports team of the fantasy sports teams in the first contest;

receiving, by the computer system via the graphical user interface, second user input comprising a selection of one or more individual athletes from the interactive list of one or more individual athletes to associate with the first fantasy sports team;

generating, by the computer system for display via the graphical user interface, an interactive time period selector for selection of a time period by the first user;

receiving, by the computer system via the graphical user interface, third user input comprising selection of a first time period from the interactive time period selector;

obtaining, by the computer system and in response to receipt of the first, second, and third user inputs, a projected team score for the fantasy sports team, wherein the projected team score is based on one or more sports events in which the one or more individual athletes associated with the first fantasy sports team participate during the first time period;

generating, by the computer system and in response to receipt of the first, second, and third user inputs, a set of wager opportunities based on the projected team score for the fantasy sports team, the set of wager opportunities comprising at least a first wager opportunity and a second wager opportunity, wherein the first wager opportunity includes a first benchmark point level and first odds determined based on a relation between the first benchmark point level and the projected team score, and wherein the second wager opportunity includes a second benchmark point level different from the first benchmark point level and second odds determined based on a relation between the second benchmark point level and the projected team score;

generating, by the computer system and for display via the graphical user interface, an interactive listing of the set of wager opportunities comprising, for the first wager opportunity, the first benchmark point level, the first odds, a user-adjustable first wager amount, and a first potential payout amount calculated based on a value of the user-adjustable first wager amount and the first odds, and, for the second wager opportunity, the second benchmark point level, the second odds, a user-adjustable second wager amount, and a second potential payout amount calculated based on a value of the user-adjustable second wager amount and the second odds, wherein the first and/or second potential payout amount is provided based on whether the first and/or second benchmark point level is met by an actual total score for the first fantasy sports team, the actual total score based on the one or more sports events in which the one or more individual athletes associated with the fantasy sports team participate during the first time period, wherein the first and second wager opportunities are displayed in the interactive listing of the set of wager opportunities in an order corresponding to the benchmark point levels;

receiving, by the computer system via the graphical user interface, a fourth user input comprising at least one of a first wager comprising a selection of the first wager opportunity of the set of wager opportunities, including the value of the user-adjustable first wager amount and a second wager comprising a selection of the second wager opportunity of the set of wager opportunities, including the value of the user-adjustable second wager amount;

processing, by the computer system, the received first and/or second wager based on the first or second wager opportunities;

storing, by the computer system, each of the first and/or second wagers based on the first and/or second selected wager opportunities as a hash of the first fantasy sports team and the respective odds for the first and/or second selected wager opportunities;

providing, by the computer system via the graphical user interface, an indication of the first and/or second wagers placed, the indication of the first and/or second wagers placed including the first and/or second potential payout amount;

determining, by the computer system, upon completion of the one or more sports events in which the one or more individual athletes associated with the first fantasy sports team participate during the first time period, that the actual total score for the first fantasy sports team has met the first benchmark point level for the first wager opportunity and/or the second benchmark point level for the second wager opportunity; and providing, by the computer system via the graphical user interface, an indication that the first user has won the first potential payout based on the determination that the actual total score for the first fantasy sports team has met the first benchmark point level for the first selected wager opportunity and/or an indication that the first user has won the second potential payout based on the determination that the actual total score for the first fantasy sports team has met the second benchmark point level for the second wager opportunity; and provide the first and/or second payout to the first user in accordance with the first user account data.

10. The method of claim 9, wherein obtaining the projected team score for the first fantasy sports team comprises obtaining the projected team score from a third party source.

11. The method of claim 9, wherein obtaining the projected team score for the first fantasy sports team comprises generating the projected team score based at least in part on past performance of the one or more individual athletes associated with the first fantasy sports team.

12. The method of claim 9, wherein the projected team score is based on wagers placed by at least one other user.

13. The method of claim 9, wherein the respective first and second benchmark point levels of the set of wager opportunities include benchmark point levels above, at, and/or below the projected team score.

14. The method of claim 9, wherein:
the first contest parameters comprise defining the one or more individual athletes eligible for association with the first fantasy sports team by the first user and user-defined scoring rules for the first contest;
the interactive list of one or more individual athletes available for selection by the first user includes only athletes eligible for selection based on the first contest parameters; and
the set of wager opportunities is determined based on the user-defined scoring rules for the first contest.

15. The method of claim 9, wherein:
the interactive contest parameters selector displays at least one parameter that is unique to a type of sport associated with the first fantasy sports team; and
the interactive list of one or more individual athletes available for selection comprises a plurality of selectable indicia capable of being populated with identifying information of the one or more individual athletes, one or more of the selectable indicia having predefined associations with corresponding roles of one or more of athletes on the first fantasy sports team.

16. The method of claim 9, wherein the first contest parameters comprises a number of individual athletes that may be associated with the first fantasy sports team.

* * * * *